(12) United States Patent
Morgan et al.

(10) Patent No.: US 11,361,374 B2
(45) Date of Patent: Jun. 14, 2022

(54) COMPUTERIZED SYSTEM HAVING A CENTRAL PROCESS FACILITATOR IN COMMUNICATION WITH SAFES AND OPERATING PROCESS THEREOF

(71) Applicant: BRINK'S NETWORK, INC., Richmond, VA (US)

(72) Inventors: William C. Morgan, Canton, GA (US); Glenn Mason, Southlake, TX (US); Gregory B. King, Grapevine, TX (US); Aaron Baker, Plano, TX (US); Kevin R. Boland, Southlake, TX (US); Frederick Purches, Copell, TX (US); Paul Blachowicz, Lantana, TX (US); James Poteet, Lewisville, TX (US)

(73) Assignee: Brink's Network, Inc., Richmond, VA (US)

( * ) Notice: Subject to any disclaimer, the term of this patent is extended or adjusted under 35 U.S.C. 154(b) by 338 days.

(21) Appl. No.: 16/008,316

(22) Filed: Jun. 14, 2018

(65) Prior Publication Data

US 2018/0293649 A1    Oct. 11, 2018

Related U.S. Application Data

(63) Continuation-in-part of application No. 12/437,216, filed on May 7, 2009, now abandoned, which is a
(Continued)

(51) Int. Cl.
*G06Q 30/00* (2012.01)
*G06Q 40/02* (2012.01)
(Continued)

(52) U.S. Cl.
CPC .............. *G06Q 40/02* (2013.01); *G06Q 10/08* (2013.01); *G06Q 20/042* (2013.01);
(Continued)

(58) Field of Classification Search
CPC ...................................................... G06Q 40/02
(Continued)

(56) References Cited

U.S. PATENT DOCUMENTS

| 3,852,571 A | 12/1974 | Hall et al. |
| 3,998,155 A | 12/1976 | Cothran et al. |

(Continued)

FOREIGN PATENT DOCUMENTS

| CA | 2 510 812 A | 12/2005 |
| EP | 0 455 200 A2 | 11/1991 |

(Continued)

OTHER PUBLICATIONS

ProQuestNPLSearch History.*
(Continued)

*Primary Examiner* — John H. Holly
(74) *Attorney, Agent, or Firm* — McGuireWoods LLP

(57) ABSTRACT

A process facilitator in communication with a safe located at a first location of an entity external to the process facilitator and further in communication with a banking institution located at a second location external to the process facilitator and different from the first location, wherein the process facilitator functions as an intermediary between the safe and the banking institution in order to reduce the processing requirements on the safe and the improve the efficiency of electronic communications with the banking institution. A system comprising the process facilitator and one or more safes in communication with the process facilitator and using the process facilitator as the intermediary between the safes and the banking institution is also described.

16 Claims, 8 Drawing Sheets

Related U.S. Application Data continuation-in-part of application No. 12/178,109, filed on Jul. 23, 2008, now Pat. No. 8,844,804, and a continuation-in-part of application No. 11/924,055, filed on Oct. 25, 2007, now abandoned.

(60) Provisional application No. 60/953,557, filed on Aug. 2, 2007, provisional application No. 61/080,885, filed on Jul. 15, 2008.

(51) Int. Cl.

| | | |
|---|---|---|
| *G06Q 10/08* | (2012.01) | |
| *G07D 11/34* | (2019.01) | |
| *G07D 11/125* | (2019.01) | |
| *G06Q 20/10* | (2012.01) | |
| *G06Q 40/00* | (2012.01) | |
| *G06Q 20/04* | (2012.01) | |
| *G06Q 20/20* | (2012.01) | |

(52) U.S. Cl.
CPC ........... *G06Q 20/108* (2013.01); *G06Q 20/20* (2013.01); *G06Q 40/00* (2013.01); *G07D 11/125* (2019.01); *G07D 11/34* (2019.01)

(58) Field of Classification Search
USPC ........... 705/45, 1.1, 30, 16, 18, 21; 235/379, 235/383, 10, 12; 382/284, 283, 138, 209
See application file for complete search history.

(56) References Cited

U.S. PATENT DOCUMENTS

| | | | |
|---|---|---|---|
| 4,084,520 A | 4/1978 | Frier | |
| 4,314,352 A | 2/1982 | Fought | |
| 4,674,060 A | 6/1987 | Larkin et al. | |
| 5,025,372 A | 6/1991 | Burton et al. | |
| 5,051,900 A | 9/1991 | Ito et al. | |
| 5,117,355 A | 5/1992 | McCarthy | |
| 5,252,811 A | 10/1993 | Henochowicz et al. | |
| 5,265,007 A | 11/1993 | Barnhard, Jr. et al. | |
| 5,326,960 A | 7/1994 | Tannenbaum | |
| 5,564,546 A | 10/1996 | Molbak et al. | |
| 5,583,759 A | 12/1996 | Geer | |
| 5,620,079 A | 4/1997 | Molbak | |
| 5,630,073 A | 5/1997 | Nolan | |
| 5,668,897 A * | 9/1997 | Stolfo ...................... G06K 9/00 382/283 |
| 5,695,038 A | 12/1997 | Keith, III et al. | |
| 5,704,491 A | 1/1998 | Graves | |
| 5,717,868 A | 2/1998 | James | |
| 5,774,663 A | 6/1998 | Randle et al. | |
| 5,787,403 A | 7/1998 | Randle | |
| 5,813,510 A | 9/1998 | Rademacher | |
| 5,899,982 A | 5/1999 | Randle | |
| 5,910,988 A | 6/1999 | Ballard | |
| 5,920,848 A | 7/1999 | Schutzer et al. | |
| 5,930,788 A | 7/1999 | Wical | |
| 5,944,163 A | 8/1999 | Keith, III et al. | |
| 5,950,179 A | 9/1999 | Buchanan et al. | |
| 5,963,647 A | 10/1999 | Downing et al. | |
| 5,974,146 A | 10/1999 | Randle et al. | |
| 5,975,275 A | 11/1999 | Keith, III et al. | |
| 6,032,137 A | 2/2000 | Ballard | |
| 6,067,530 A | 5/2000 | Brooks, Jr. et al. | |
| 6,105,007 A | 8/2000 | Norris | |
| 6,105,009 A | 8/2000 | Cuervo | |
| 6,119,106 A | 9/2000 | Mersky et al. | |
| 6,182,052 B1 | 1/2001 | Fulton et al. | |
| 6,202,054 B1 | 3/2001 | Lawlor et al. | |
| 6,328,208 B1 | 12/2001 | Artino et al. | |
| 6,341,272 B1 | 1/2002 | Randle | |
| 6,405,182 B1 | 6/2002 | Cuervo | |
| 6,523,742 B1 | 2/2003 | Awatsu et al. | |
| 6,594,647 B1 | 7/2003 | Randle et al. | |
| 6,626,357 B1 | 9/2003 | Ross | |
| 6,659,340 B2 | 12/2003 | Siemens | |
| 6,663,001 B2 | 12/2003 | Suttie et al. | |
| 6,885,281 B2 | 4/2005 | McGunn et al. | |
| 6,896,177 B2 | 5/2005 | Carter | |
| 7,000,828 B2 | 2/2006 | Jones | |
| 7,062,463 B2 | 6/2006 | Knapp | |
| 7,063,252 B2 | 6/2006 | Smith et al. | |
| 7,070,093 B2 | 7/2006 | Siemens et al. | |
| 7,111,754 B1 | 9/2006 | Siemens | |
| 7,113,929 B1 | 9/2006 | Beach et al. | |
| 7,143,933 B2 | 12/2006 | Uematsu et al. | |
| 7,191,151 B1 | 3/2007 | Nosek | |
| 7,207,478 B1 | 4/2007 | Blackson et al. | |
| 7,216,098 B1 * | 5/2007 | Brooks, Jr. ............ G06Q 20/20 705/30 |
| 7,219,083 B2 | 5/2007 | Bellucci et al. | |
| 7,264,150 B1 | 9/2007 | Moreland et al. | |
| 7,428,985 B1 | 9/2008 | Moreland et al. | |
| 7,472,826 B2 | 1/2009 | Vallance | |
| 7,519,551 B2 | 4/2009 | Bent et al. | |
| 7,520,421 B2 | 4/2009 | Salafia, III et al. | |
| 7,610,215 B1 | 10/2009 | Folk et al. | |
| 7,624,919 B2 | 12/2009 | Meek et al. | |
| 7,635,085 B2 | 12/2009 | Brown et al. | |
| 7,672,886 B2 | 3/2010 | Bent et al. | |
| 7,681,707 B2 | 3/2010 | Tabachnik | |
| RE42,820 E | 10/2011 | Vallance | |
| 8,157,162 B2 | 4/2012 | Jonsson et al. | |
| RE43,888 E | 1/2013 | Vallance | |
| 8,844,804 B2 * | 9/2014 | Blachowicz ............ G06Q 20/10 235/379 |
| 2001/0054643 A1 | 12/2001 | Siemens | |
| 2002/0011393 A1 | 1/2002 | Siemens | |
| 2002/0063034 A1 | 5/2002 | Dobbins | |
| 2002/0087468 A1 | 7/2002 | Ganesan et al. | |
| 2002/0091637 A1 | 7/2002 | Bent et al. | |
| 2002/0100399 A1 | 8/2002 | Young | |
| 2002/0145035 A1 | 10/2002 | Jones | |
| 2003/0080185 A1 | 5/2003 | Werther | |
| 2003/0105709 A1 | 6/2003 | Orlando | |
| 2003/0116622 A1 | 6/2003 | Suttie et al. | |
| 2003/0191722 A1 | 10/2003 | Thompson et al. | |
| 2003/0208438 A1 | 11/2003 | Rothman | |
| 2003/0208439 A1 | 11/2003 | Rast | |
| 2004/0139000 A1 | 7/2004 | Amos | |
| 2004/0148254 A1 | 7/2004 | Hauser | |
| 2004/0193537 A1 | 9/2004 | Knapp | |
| 2004/0210515 A1 | 10/2004 | Hughes | |
| 2004/0226493 A1 | 11/2004 | Siemens et al. | |
| 2004/0267673 A1 | 12/2004 | Ballard et al. | |
| 2005/0010525 A1 | 1/2005 | Ross et al. | |
| 2005/0096986 A1 | 5/2005 | Taylor et al. | |
| 2005/0108164 A1 | 5/2005 | Salafia et al. | |
| 2005/0187876 A1 | 8/2005 | Gessler | |
| 2005/0228733 A1 | 10/2005 | Bent et al. | |
| 2006/0036537 A1 | 2/2006 | Lawrence et al. | |
| 2006/0106716 A1 | 5/2006 | Hurwitz et al. | |
| 2006/0253332 A1 | 11/2006 | Dobbins | |
| 2006/0253349 A1 | 11/2006 | Brooks et al. | |
| 2006/0282271 A1 | 12/2006 | Ananda et al. | |
| 2007/0108267 A1 | 5/2007 | Jonsson et al. | |
| 2007/0130063 A1 | 6/2007 | Jundia et al. | |
| 2007/0194102 A1 | 8/2007 | Cohen et al. | |
| 2008/0120232 A1 | 5/2008 | Herrin et al. | |
| 2008/0123932 A1 | 5/2008 | Jones et al. | |
| 2008/0301049 A1 | 12/2008 | Dyson | |
| 2009/0006249 A1 | 1/2009 | Morgan et al. | |
| 2009/0018959 A1 | 1/2009 | Doran et al. | |
| 2011/0011927 A1 | 1/2011 | Dobbins | |

FOREIGN PATENT DOCUMENTS

| | | |
|---|---|---|
| EP | 1 445 744 A1 | 11/2004 |
| GB | 807 880 A | 1/1959 |
| GB | 2 079 846 A | 1/1982 |
| GB | 2 130 299 A | 5/1984 |
| GB | 2 326 671 A | 12/1998 |
| JP | 58-195272 A | 11/1983 |

(56) References Cited

FOREIGN PATENT DOCUMENTS

| RU | 64 667 U1 | 7/2007 |
|---|---|---|
| WO | 00/46728 A1 | 8/2000 |
| WO | 00/11528 A1 | 2/2001 |
| WO | 02/093457 A1 | 11/2002 |

OTHER PUBLICATIONS

Brinks Webpage Compusafe Service. Jun. 8, 2004. http://web.archive.org/web/20040608125029/http://www.us.brinksinc.com/com pusafeservice/index.htm (1 pg).

Coinstar International Form 1 0-K Report for the United States Securities and Exchange Commission. Jul. 30, 2005. http://web.archive.org/web/20050730075723/http://www.getfilings.com/00001 193125-04-025356.Html (58 pgs).

Brinks Webpage on Logistics Solutions. Oct. 26, 2005. http://web.archive.org/web/20051026013157/http7/www.brinksinc.com/solutions and_ services/index.html (2 pgs).

Brink's CompuSafe Family of Services; Brinks Webpage on Compusafe Service. Dec. 16, 2005. http://web.archive.org/web/2005121 6122333/http://www.us.brinksinc.com/high_tech_solutions/compusafe overview. Html (3 pgs).

http://web.archive.org/web/20040608083944/http://www.us.brinksinc.com/compusafeservice/how_it_all_works.html Printed Oct. 31, 2016 (1 pg).

Brinks Fact Sheet on Compusafe Service. Nov. 13, 2006. http://web.archive.org/web/2006111323425/www.us.brinksinc.com/high_tech_ solutions/factsheet. pdf 5// (2 pgs).

Brinks Brochure on Compusafe Service. Nov. 13, 2006. http://web.archive.org/web/20061113232349/www.us.brinksinc.com/high_tech_ solutions/Final_CompusafeFolder2005.pdf (3 pgs).

Ferrari, Michael. Thinking Outside the Safe Box. Apr. 2007. Convenience Store Decisions. p. 34-35. (2 pgs).

Brink's Helps Retailers Turn Cash Receipts Into Investable Funds Faster, Oct. 20, 2008 www.pr-inside.com/print870847.htm (2 pgs).

* cited by examiner

US 11,361,374 B2

COMPUTERIZED SYSTEM HAVING A CENTRAL PROCESS FACILITATOR IN COMMUNICATION WITH SAFES AND OPERATING PROCESS THEREOF

REFERENCE TO RELATED APPLICATION

This application is a continuation-in-part of U.S. patent application Ser. No. 12/437,216, filed on May 7, 2009, which is a continuation-in-part of U.S. patent application Ser. No. 12/178,109, filed Jul. 23, 2008, now U.S. Pat. No. 8,844,804, issued on Sep. 30, 2014, and is a continuation-in-part of U.S. patent application Ser. No. 11/924,055, filed Oct. 25, 2007, all of which claim priority to U.S. provisional patent application No. 60/953,557, filed Aug. 2, 2007. In addition, U.S. application Ser. No. 12/437,216 claims priority to U.S. provisional patent application No. 61/080,885, filed Jul. 15, 2008. The disclosures of U.S. patent application Ser. Nos. 12/437,216, 61/080,885, 12/178,109, 11/924,055 and 60/953,557 are incorporated herein by reference.

FIELD OF THE INVENTION

The present invention relates to a computerized system having a centralized process facilitator in communication with one or more safes and also in communication with one or more banking institutions, and a computer-implemented operating process of the system. In the present invention, the process facilitator functions as a central trusted intermediary between one or more safes and one or more banking institutions, which improves the functioning of the system as a whole and results in a number of technical advantages.

The computerized system of the present invention facilitates collection of currency by an entity and advancing of credit to the entity by the banking institution based on collected currency at a time prior to removal of the currency from the entity's location. In particular, the present invention relates to a computer-implemented process of and a computerized system for advancing credit for cash currency and check collections, and more particularly, relates to advancing credit to entities or establishments based upon the value of cash and checks collected thereby during normal operations, without requiring physical transport of the collected currency prior to advancing of the credit.

BACKGROUND OF THE INVENTION

With today's fast-paced mentality, individuals and businesses expect instructions and tasks to be quickly acted upon in a wide-range of activities. For example, consumer transactions, via the Internet and at retail stores, are conducted substantially quicker today than years ago due to the use of more sophisticated technology. Similarly, banking transactions occur rapidly, such as the transfer of funds between accounts or electronic transfers to pay for goods or services. Many other examples also are available. There are, however, numerous areas that have not yet been substantially impacted by current technology and other advances. One such area entails the use of physical currency, including cash (i.e., coin and currency) and checks, in particular, the use of physical currency by customers who purchase goods or services at retail establishments. In such types of transactions, while the speed at which the transactions themselves take place are relatively short (e.g., a few minutes), the speed at which the currency is subsequently used by the businesses that accepted the currency is enormously slow. More specifically, retailers who take-in relatively large amounts of physical currency usually employ cash handling services to periodically pickup the currency (e.g., using an armored car service) and to arrange for that currency to be deposited into a bank. Usually, the currency first is transferred to a cash handling facility that counts and processes the currency before it is transferred to a bank. The retailer then is credited with the deposit of currency and, upon being credited, is able to utilize the funds. This entire process—from receiving the currency from customers to receiving the bank credit—unfortunately often spans several or more days. Hence, while modern developments have benefited businesses by enabling a multitude of tasks to be carried at remarkably fast rates, companies still currently are unable to make use of their physical currency collections until the currency is physically transferred to the bank after undergoing several days of processing and handling.

SUMMARY OF THE INVENTION

The present invention provides a computerized system that enables an entity, such as a retailer and another establishment, to obtain credit for currency collected thereby before physical removal of the collected currency from the entity's location.

Specifically, the present invention provides a computerized system that includes a central process facilitator which electronically communicates with a currency receiving device at the entity's location so as to receive, from the currency receiving device, data related to the collected currency at the entity's location and electronically communicates with a banking institution so as to provide credit to the entity by the banking institution at the time of currency collection as opposed to when the currency is physically transported to the banking institution.

The present invention provides a technologically efficient system in which the currency receiving devices handle currency processing operations to generate data related to the collected currency and the central facilitator device processes and securely electronically communicates information to banking institution(s), based on the data received from the currency receiving devices, in order to facilitate issuance of a credit for the collected currency.

The present invention enables entities to benefit from their currency collections independently of physical pickups of the collected currency, cash pickup schedules, cash vault cut-off windows and other schedules imposed by third parties.

These benefits are achieved by the process facilitator in communication with a safe, i.e., a currency receiving device, located at a first location of an entity external to the process facilitator and further in communication with a banking institution located at a second location external to the process facilitator and different from the first location. The process facilitator comprises a communication interface that electronically communicates with the safe and electronically communicates with the banking institution, a processor and a memory storing instructions for causing the processor to execute the operations of receiving from the safe, using the communication interface, for each business day of a plurality of business days, data including a value of currency collected by the safe between the end of a day of a business day preceding the respective business day and the end of a day for the respective business day, and communicating with the banking institution, using the communication interface, on each business day of the plurality of business days, to provide actual crediting to the entity by the banking institution based on the value included in the data received from the safe on the respective business day, with the actual crediting being provided on the respective business day and prior to removal of the collected currency from the safe. In the present invention, the process facilitator functions as an intermediary between the safe and the banking institution.

The above benefits are also achieved by a system that includes the process facilitator and the safe located at the first location that is external to the process facilitator. The safe comprises a bill acceptor for collecting cash currency and a sealed cassette into which the safe automatically transfers the collected cash currency. The safe also includes a safe processor that identifies the cash currency collected into the sealed cassette, to determine the total value of the cash currency collected into the sealed cassette and to generate deposit information identifying the cash currency collected into the sealed cassette. These features of the safe improve the functioning of the system by automatically generating deposit information that includes data required for processing the collected currency so that the processing of the collected cash currency is performed at the time of collection.

The process facilitator improves the functioning of computer-based banking and cash-collection systems by acting as a central trusted intermediary between one or more safes, which hold the collected currency, and one or more banking institutions, which are located at different locations from the safes and which issue credits for the collected currency before the currency is removed from the safes. The process facilitator securely receives, from one or more safes, data regarding the value of currency collections for a period of time, e.g., one business day, and securely transmits the data, which may be encrypted, to respective banking institutions. This network arrangement of the process facilitator with respect to the safes and the banking institutions results in a number of improvements to the functioning of the whole system.

In the present invention, the central process facilitator consolidates data regarding currency collections from multiple safes provided at different locations of a single entity and electronically communicates with the respective banking institution in an efficient manner so as to obtain credit for the currency collected in all of the safes during the respective business day. Such efficient communication by the process facilitator reduces the amount of data required to be communicated to the banking institution, reduces the number of connection times to the banking institution and reduces the amount of bandwidth required for communication with the banking institution.

In addition, the central process facilitator can manage currency collections from multiple safes provided at different entities' locations so as to efficiently obtain individual credit for each entity for the collected currency from respective banking institutions. As a result, the banking institutions communicate with a known and trusted device, instead of having to communicate with individual entities or individual safes. Moreover, the use of the central process facilitator allows easy addition or removal of safes from the system and movement of safes from one location to another without requiring additional authorizations and authentications from the banking institutions for communication of data generated by the safes.

Furthermore, by using a central process facilitator, which communicates electronically with multiple safes provided at different locations and which receives and processes data from multiple safes, the processing required to be performed by the individual safes is reduced. As a result, each individual safe is able to more efficiently and accurately process the currency it receives and the safes require less storage and processing power. Thus, the system distributes the functionalities and processing to be performed among each of the devices within the system in order to improve the overall efficiency of the system and to minimize the communications required by the system with the banking institutions so as to efficiently provide credit to each entity. In addition, by requiring less storage and processing power at each safe, manufacturing and maintenance costs of the system as a whole are reduced.

A further technological benefit of this system configuration and of using the central process facilitator is the substantial reduction in configuring requirements for each individual safe. Specifically, each safe provided at a respective entity location needs to be configured for communication with the process facilitator and to have the data transmitted from the safe associated with the respective entity. However, the safe does not need to be specially configured to be able to communicate with a specific banking institution, which would require separate authorizations and authentications. In addition, when an entity updates or changes its banking information, this information can be updated by the entity by accessing a web site or an application tool associated with the process facilitator in order to centrally update the banking information and any other information related to the entity. Therefore, there is no need to re-configure the safe each time entity-related information is updated or changed.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

Figure 1A:
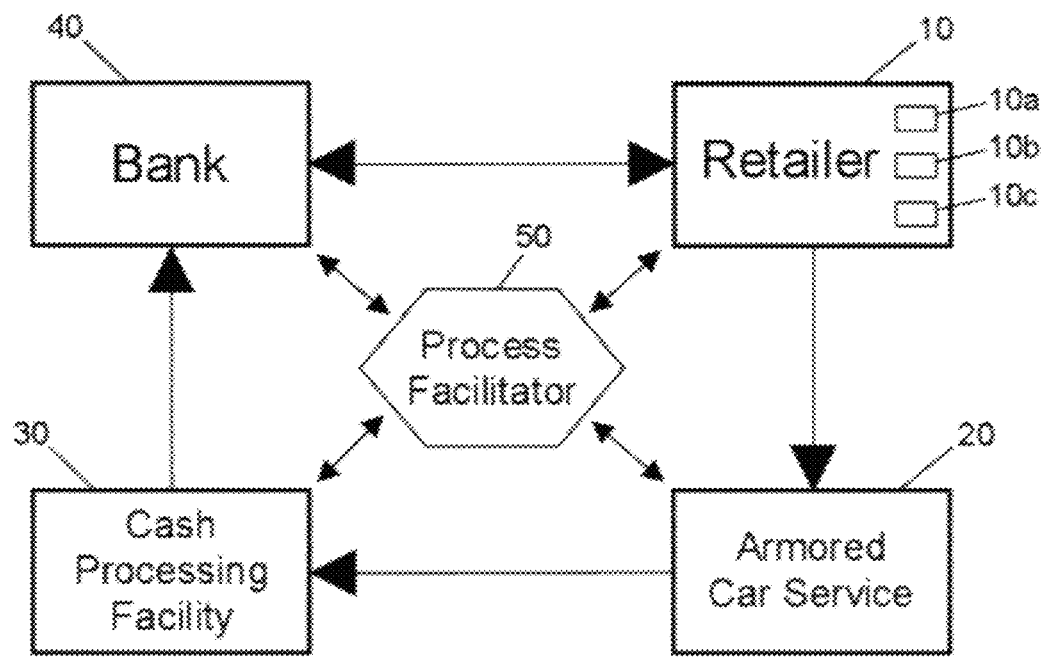
FIGS. 1A and 1B are block diagrams that show multiple entities that may be involved in a currency collection process that embodies the present invention.

The present invention takes the store-level currency handling, including cash and check handling, into the electronic age. As will be described, the present invention improves currency processing using a computerized system, with higher efficiency and distributed processing among the system devices, expedites funds availability for entities that collect currency and improve their cash flows, and provides a number of technological benefits that improve the functioning and efficiency of the whole system.

In accordance with the present invention, the general system/process entails multiple entities and devices located in different locations. As used herein, an entity generally is a company providing goods and/or services, such as a bank, an armored car service, a retail store (e.g., a department store, a grocery store), a transportation provider (e.g., an airline, a bus company), etc. For convenience, the generic terms "retailer" or "point of sale" are used herein to refer to a company that provides goods and/or services in exchange for money and where that retailer sometimes (perhaps often) accepts currency, including physical cash (paper currency and coins) and checks, in exchange for such goods and/or services. A retailer may be disposed at a single location or at multiple locations (e.g., sometimes referred to as a "chain"). As various examples only, a retailer may be a department store, a grocery store, a gas station, etc., or an entity that sells or otherwise provides services, such as a transportation provider (e.g., an airline or a bus company), a spa/gymnasium, a health care provider, a law office, etc. or an entity that offers, leases or otherwise provides both goods and services. Each retailer may have one or more physical store locations. As set forth herein, the terms "commercial establishment", "retailer" and "entity" are interchangeably used to refer to such a company that provides goods and/or services in exchange for money and where currency, such as physical cash and checks, is accepted.

As described in more detail below, the present invention uses one or more currency receiving devices, such as safes, provided at retailer location(s) for collecting currency, including physical cash and checks, over a period of time, which typically spans multiple business days. The present invention also uses a central process facilitator, which is a computerized device with a processor, a memory and a communication interface and which is located at a location that is different from the retailer location(s). The central process facilitator electronically communicates, via the communication interface, with one or more currency receiving devices to receive data from each of the currency receiving devices on each business day of a plurality of business days (or on each sub-period of a predetermined time period). The data received by the central process facilitator includes information regarding a value of currency collected by each currency receiving device for the respective business day or for the respective sub-period. The central process facilitator also electronically communicates, via the communication interface, with a financial institution, such as a banking institution, on each business day or each sub-period, to provide actual crediting to the retailer based on the value included in the data received from the retailer's safe(s) on the respective business day or sub-period. This crediting is provided on prior to removal of the collected currency from the currency receiving device, i.e., while the collected currency is still located in the currency receiving device. Thus, the central process facilitator is used as a central trusted intermediary between the currency receiving devices and the financial institution(s). As discussed in more detail below, this arrangement of the remote currency receiving devices and the central process facilitator results in a number of technological improvements to the whole system, in addition to the retailers benefiting from expedited processing of collected currency and expedited issuance of credit to the retailers.

As described in more detail below, each currency receiving device is capable of collecting physical cash and/or checks. In the present invention, the currency receiving device images checks collected at a retailer's location, determines, based on the check images, at least a value of each check and identification information included on the check, and transmits data including a value of collected checks during the respective business day or sub-period to the central process facilitator, which then communicates with a banking institution to provide actual advance bank credit to the retailer for the value of collected checks included in the data received from the currency receiving device. In certain embodiments, the currency receiving device collects both physical cash and checks as currency, and transmits data including a value of collected cash and checks during the respective business day or sub-period to the central process facilitator, which then communicates with a banking institution to provide actual advance bank credit to the retailer for the value of collected cash and checks included in the data received from the currency receiving device.

The term "check" (spelled "cheque" in various countries) as used herein refers to the common understanding of what a check is. More formally, a check is a negotiable instrument that authorizes a financial institution, such as a bank, to transfer to a specified entity a designated amount of money from an account held at that financial institution. There are different types of checks. The most common type of check is an "order" check, which is payable only to the named payee. Other types of checks (or sub-types of order checks) include a bearer check (e.g., made payable to "bearer" or "cash"), a bank check, a certified check, a traveler's check, a money order, a postal order, etc. As provided herein, a "check" may be any of these types of negotiable instruments.

At a retailer, an individual typically pays for goods and/or services using cash (i.e., paper currency, coins), a credit card, a debit card, or by check. Many retailers, however, do not accept one or more of these types of payment for various reasons, such as inconvenience, high transaction processing fees, delayed processing, risk of default (e.g., a "bounced" check) or other reason. In fact, for multiple reasons, many retailers do not accept payment by check. Other retailers discourage payment by check or impose restrictions on check usage, such as, for example, by accepting only "in-state" checks. As herein described, the present invention provides a computerized process/system that eliminates or minimizes various shortcomings of retail check processing and handling, and efficiently processes checks collected by retailers. The present invention provides retailers with improved convenience, better money management and other benefits when accepting checks for payment of goods or services. In addition, the present invention has technological advantages resulting from the use of the central process facilitator that communicates with the currency receiving devices and with banking institutions and acts as a trusted intermediary between the currency receiving devices and banking institutions to efficiently provide expedited crediting to the retailer and to promptly process checks collected by the retailer.

Prior to describing the inventive process/system, a discussion of typical, existing cash and check collection processes is helpful in understanding the benefits of the present invention. As is well known, cash that is collected by a particular retailer may be picked-up by an armored car service which in turn brings the cash to a cash processing facility. The cash processing facility generally counts the cash and deposits the counted cash within a bank. The cash is recounted by the bank and the retailer's bank account is credited with the amount of the deposit. As is appreciated, in such a typical, existing cash collection process, retailers encounter a lag, often a period of several days if not more, between when the retailer acquires funds in the form of cash and when the retailer is able to utilize those funds. Similarly, typical check processing employed today entails a lag from when a check initially is received by a retailer to when that check is initially processed, and an even greater lag from when the check is received by the retailer to when the funds represented by the check become available for use by that retailer.

For large retailers, the amount of cash and checks collected on a daily basis may total in the tens of thousands or hundreds of thousands of dollars, perhaps more. These funds are unusable, and do not bear interest, during this lag period. Even for businesses that collect relatively small amounts of cash and checks, the cumulative affect of non-use, for example, over a 12-month period, of these funds result in a measurable and meaningful impact on such businesses.

As described herein, the present invention provides for a novel process/system for processing checks and physical cash at the retailer's place of business (i.e., at the point of sale) and advancing credit to retailers based on amounts of cash and that correspond to the funds represented by the checks collected by the retailers during their normal operations. By advancing such credit, retailers are able to enjoy the benefit of cash and check collections almost immediately, thereby enabling retailers to immediately bear interest on such funds or to otherwise immediately utilize such funds in manners suitable for the retailers' successful operations.

In addition, the system of the present invention includes multiple technological benefits and improves the functioning of the system of the invention as a whole by utilizing a central process facilitator that acts as an intermediary between currency receiving devices and banking institutions. This type of an arrangement distributes processing operations between the process facilitator and the currency receiving devices to ensure efficient operations, smaller amount of data communicated to banking institutions, fewer connection requirements to banking institutions, and reduced bandwidth requirements. Furthermore, this arrangement of the system provides for centralized management of retailer information, resulting in reduction of configuration requirements for individual devices and providing for dynamic updating of retailer information via the central process facilitator.

Referring now the drawings, FIG. 1A thereof is a block diagram that shows multiple entities and devices that may be involved in a currency collection process that embodies the present invention. The entities shown include retailer 10, armored car service provider 20, cash processing facility 30, bank 40, and process facilitator 50. Although five entities are shown, additional entities may also be involved to assist with one or more entities with its respective functions. Further, a single entity may carry out the functions of two or more entities and, thus, the total number of entities involved in the process may be less than the five entities shown in FIG. 1. Each of the entities shown in FIG. 1 is further described below in connection with the inventive process for advancing credit to retailers.

Figure 1B:
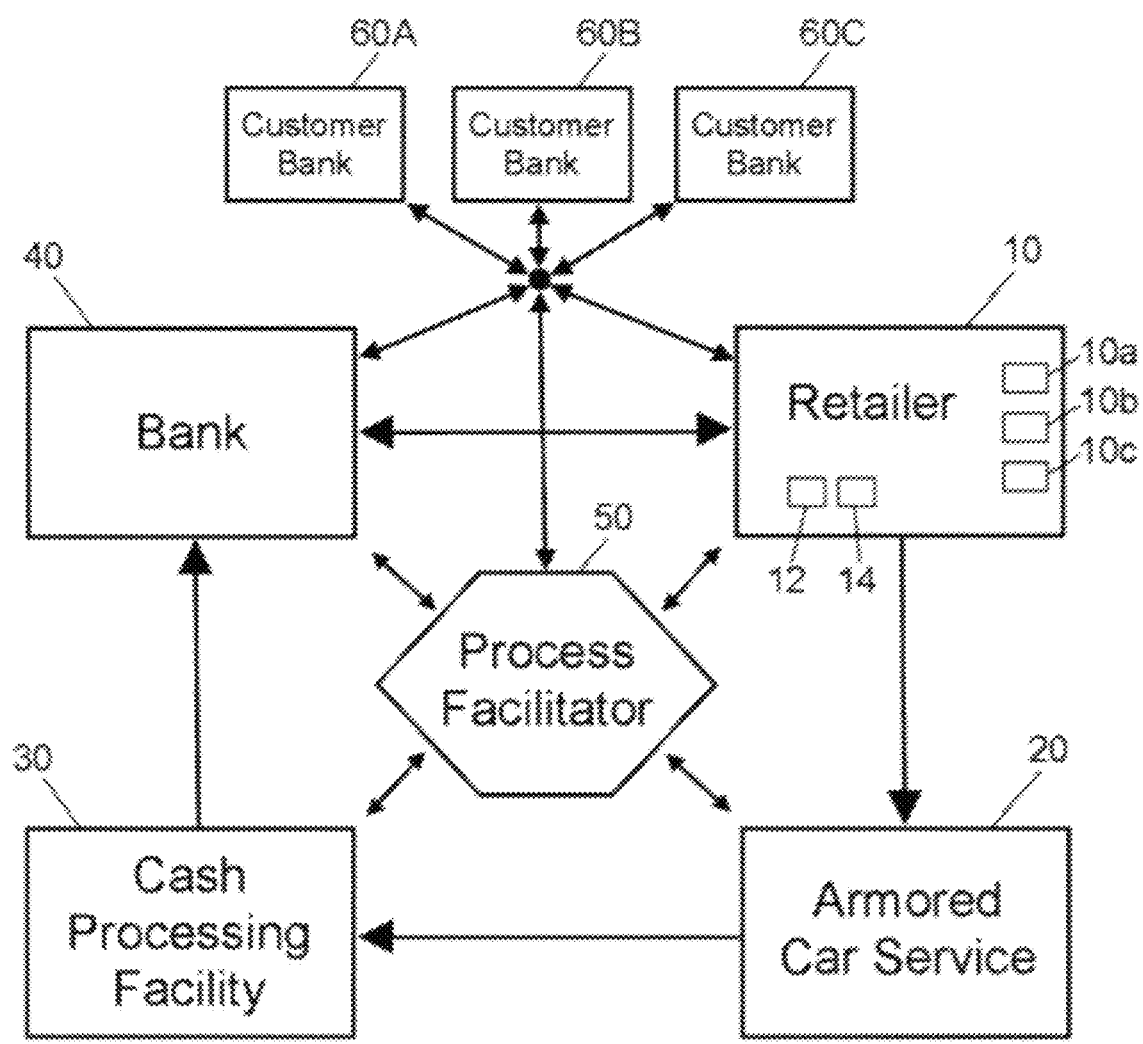

FIG. 1B of the drawings is another block diagram showing a variation of the multiple entities and components that may be involved in the currency collection process that embodies the present invention. In FIG. 1B, the entities shown include retailer 10, armored car service provider 20, cash processing facility 30, a bank 40, a process facilitator 50, and customers' banks 60A, 60B and 60C. Additional entities may also be involved to assist with one or more entities with its respective functions. In addition, a process embodying the present invention may entail fewer entities than shown in FIG. 1B.

Figure 2:
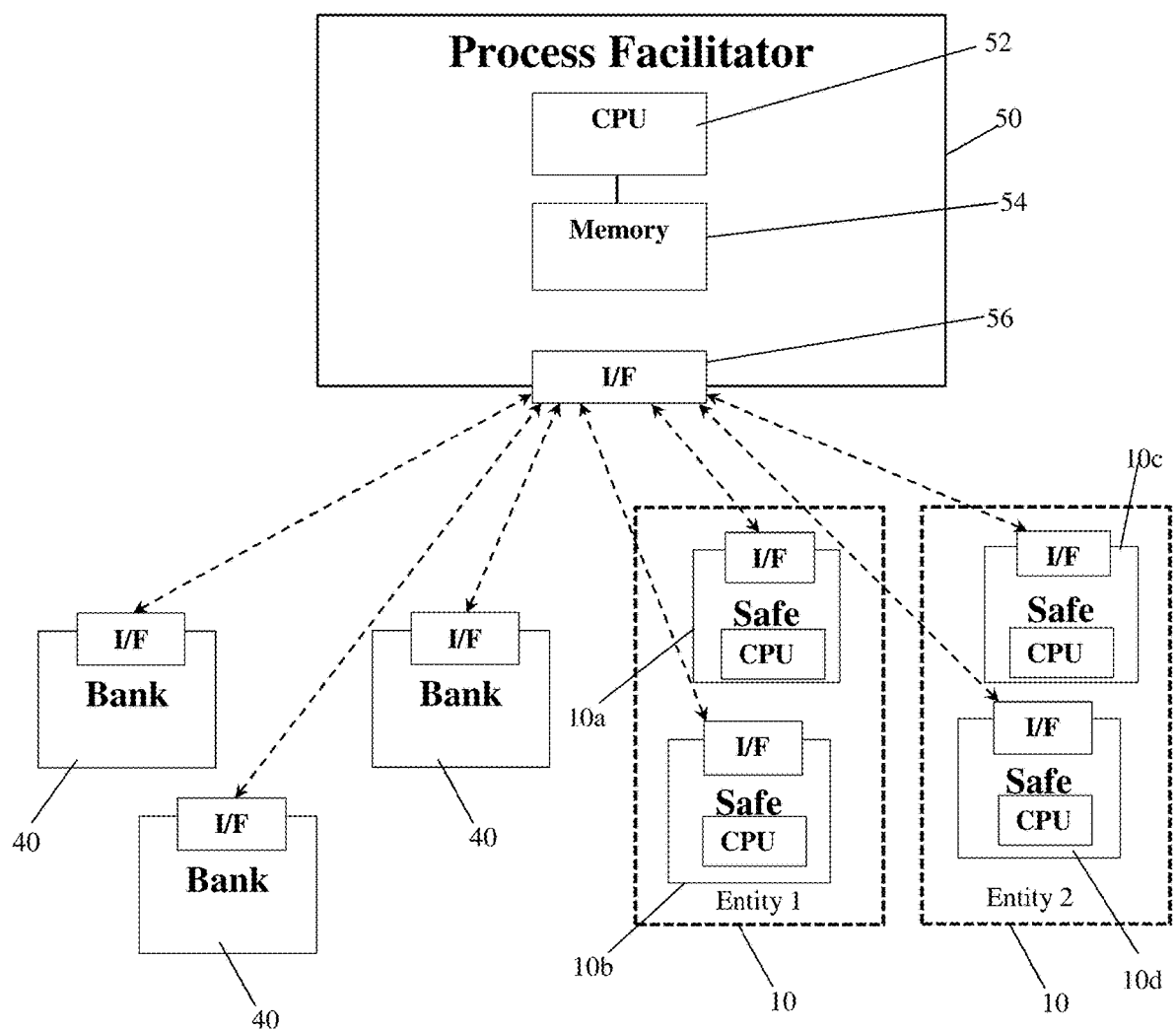
FIG. 2 shows a schematic diagram of the system of the present invention that includes a process facilitator and multiple safes, and communications between the system and banking institution(s)

FIG. 2 shows a more detailed view of the system of the present invention which includes the process facilitator 50 provided in one location and a plurality of safes 10a-10d located at different retailer's locations 10 that are different from the location of the process facilitator 50. As described below, the process facilitator 50 is a suitably programmed computing system (or systems) that receives electronically transmitted data files. Therefore, the process facilitator 50 includes a CPU 52, or any other suitable computer processor, a memory 54 or any other suitable storage device that stores programming instructions, which are executed by the CPU 52, for the functioning of the process facilitator 50 and for controlling electronic communications by the process facilitator 50. Electronic communications by the process facilitator are performed via a communication interface 56 and occur in any known manner, such as using the Internet, telephone system, a private communications network or other suitable manner.

As shown in FIG. 2, the process facilitator 50 electronically communicates with each safe 10a-10d via the communication interface 56 to receive data regarding currency collections by each safe 10a-10d during a business day of a plurality of business days or during a sub-period of a predetermined period of time. Each safe 10a-10d includes a CPU or any other suitable processor for controlling the operations of the safe and performing processing operations of the safe, and a communication interface for transmitting data to the process facilitator 50 and for receiving data, such as reports, from the process facilitator 50. The process facilitator 50 also electronically communicates with one or more banking institutions 40 via the communication interface 56. As shown, each banking institution 40 also includes a communication interface that enables communication between the banking institution 40 and the process facilitator 50.

As described in more detail below, the process facilitator 50 electronically communicates to the banking institution 40 data including information about the value of the collected currency for the respective business day or respective sub-period, which is based on the data received from the one or more safes 10a-10b corresponding to an entity 10, and identification information of the entity 10. The banking institution issues an actual credit to the entity based on the data received from the process facilitator 50 on the respective business day or the respective sub-period, while the currency collected for the respective business day or the respective sub-period is still located in the safe(s).

As shown in FIGS. 1A, 1B and 2, electronic communication of data regarding currency collected by each safe to respective banking institutions is carried out via the central process facilitator 50. Due to the strict communication requirements typically imposed on electronic communications of sensitive data to and from banking institutions, the central process facilitator 50 is required to be in compliance with the authorization and authentication requirements imposed by each banking institution for electronic communication of data between the process facilitator 50 and each banking institution 40. The central process facilitator 50 acts as a central and trusted intermediary between the safes located at retailer locations and the respective banking institutions. Since the electronic communication of data is carried out via the central process facilitator 50, each of the safes is not required to be separately configured to be authorized and authenticated to communicate with a respective banking institution. In addition, this system makes it easy to change the arrangement of the safes within the system by adding one or more safes to the system in communication with the process facilitator, removing one or more safes from the system when they are no longer needed, replacing one or more safes in the system, such as when a safe needs to be repaired, or moving one or more safes to different locations, such as when the entity changes locations. Therefore, the system of the present invention provides substantial flexibility to arrangement of the system devices within the system.

By using the central process facilitator 50 as an intermediary between the safes and the banking institutions, certain processing operations are consolidated in the central process facilitator 50, reducing the processing requirements on the individual safes and on the banking institutions. The central process facilitator 50 manages currency collections from multiple safes at different entities' locations.

Specifically, the process facilitator 50 receives, on a respective business day or a respective sub-period, data from multiple safes of an entity provided at different locations, consolidates information from the received data, and generates consolidated data which includes the total value of currency collections by the entity for the respective business day or the respective sub-period. The process facilitator 50 may also encrypt the consolidated data in conformance with the requirements of the entity's banking institution. The process facilitator 50 then communicates the consolidated data to the entity's banking institution in order to provide actual crediting to the entity by the banking institution based on the value included in the consolidated data. Thus, the process facilitator 50 accumulates data transmitted from each of the safes of the entity provided at the different locations, consolidates this data and generates consolidated data in compliance with the requirements of the banking institution before transmitting the consolidated data to the banking institution. In addition, the process facilitator 50 can similarly manage data transmitted from multiple safes of multiple entities and to communicate consolidated data generated for each of the multiple entities to their respective banking institutions.

The central management of the data by the process facilitator 50 substantially increases the efficiency of data communication from the safes to the banking institutions. By using the central process facilitator 50 to manage and consolidate data transmitted by the safe(s) of each entity, the amount of data required to be communicated to the banking institution is substantially reduced. In addition, since the process facilitator 50 communicates to the banking institution the consolidated data, the number of connection times to the banking institution required to transmit all of the data is reduced. As a result, the amount of bandwidth required for communication with the banking institution is also reduced. The above-described improvements in the efficiency of data communication result in substantial technological improvements to the whole system.

Moreover, by using the central process facilitator 50 to manage and consolidate data received from the safes and to communicate with the banking institutions, the processing required to be performed by the individual safes and by the banking institutions is reduced and the configuration requirements for the individual safes are also reduced. For example, the safes and the banking institutions are not required to accumulate and manage data from multiple safes associated with the same entity because these functionalities are performed centrally by the process facilitator 50. As a result, each individual safe is able to more efficiently process the currency it collects and requires less data storage capacity and less processing power. By distributing the processing operations between the process facilitator 50 and the safes, the overall efficiency of the system is improved, and the manufacturing, operating and maintenance costs associated with each safe are reduced.

In addition, each safe provided at a respective entity location needs to be configured for communication with the process facilitator 50 and to have the data transmitted from the safe associated with the respective entity. However, each safe does not need to be configured to communicate with a specific banking institution and is not required to be separately authorized and authenticated by the banking institution. Furthermore, updating of entity and banking information can be performed centrally through the central process facilitator, such as by accessing the process facilitator's web site or application tool, and accessing an account associated with the entity. For example, if an entity decides to change its banking institution, the entity can access its account and update this information at the process facilitator, without requiring separate updating of each safe and without requiring re-configuring of each safe associated with the entity. Therefore, the configuring and re-configuring requirements for each device of the system are substantially reduced.

The features and technological benefits of the invention result in a flexible and dynamic system and provide for centralized management and communication of data relating to currency collections by the safes. Therefore, the system of the present invention not only allows retailers to expeditiously obtain actual credit for the funds collected, but also has significant technological improvements to prior art systems by using the central process facilitator and distributing processing operations among the devices within the system.

Figure 3A:
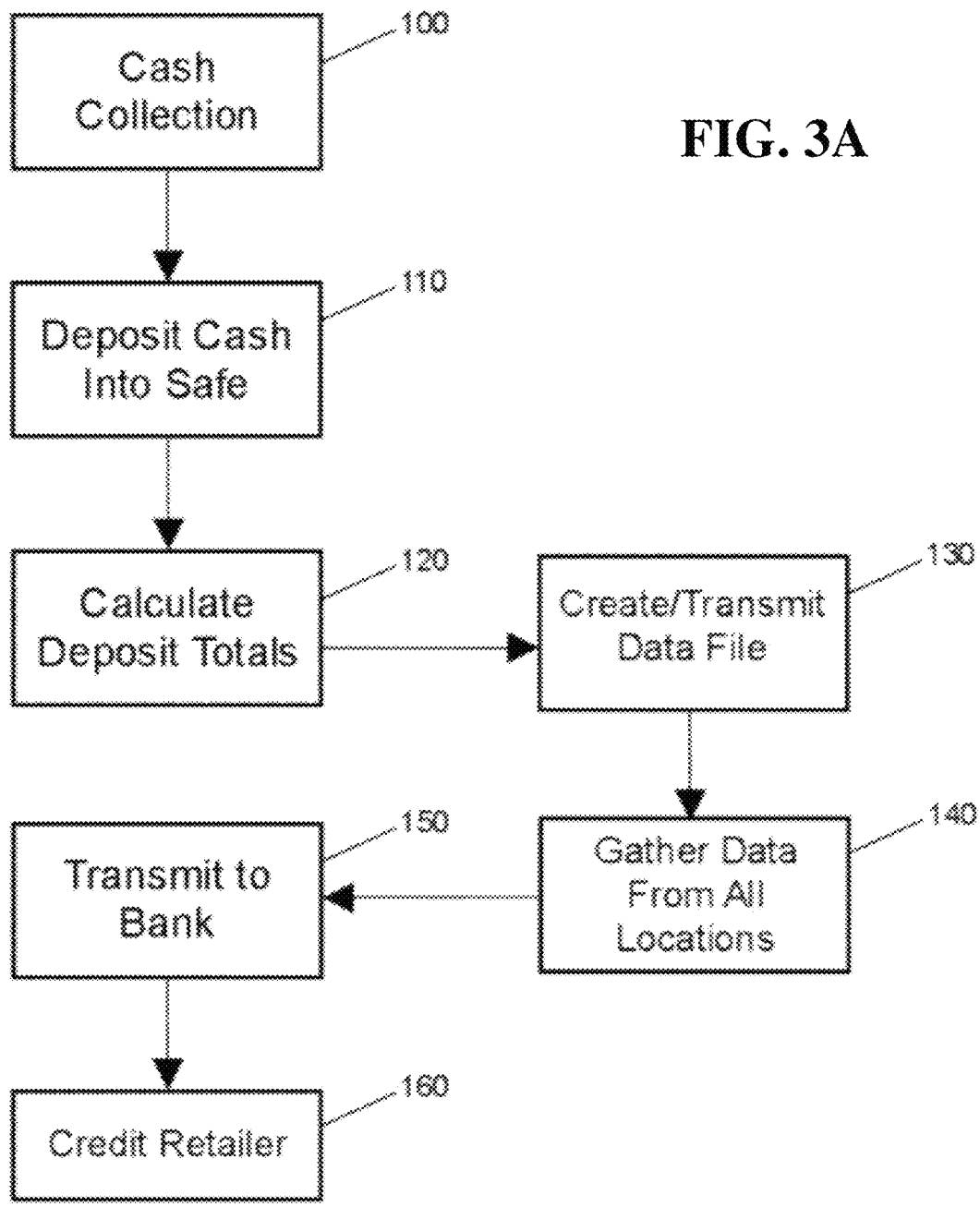
FIGS. 3A and 3B are schematic flow diagrams that shows in general terms the process for advancing credit to retailers in accordance with the present invention.
Figure 3B:
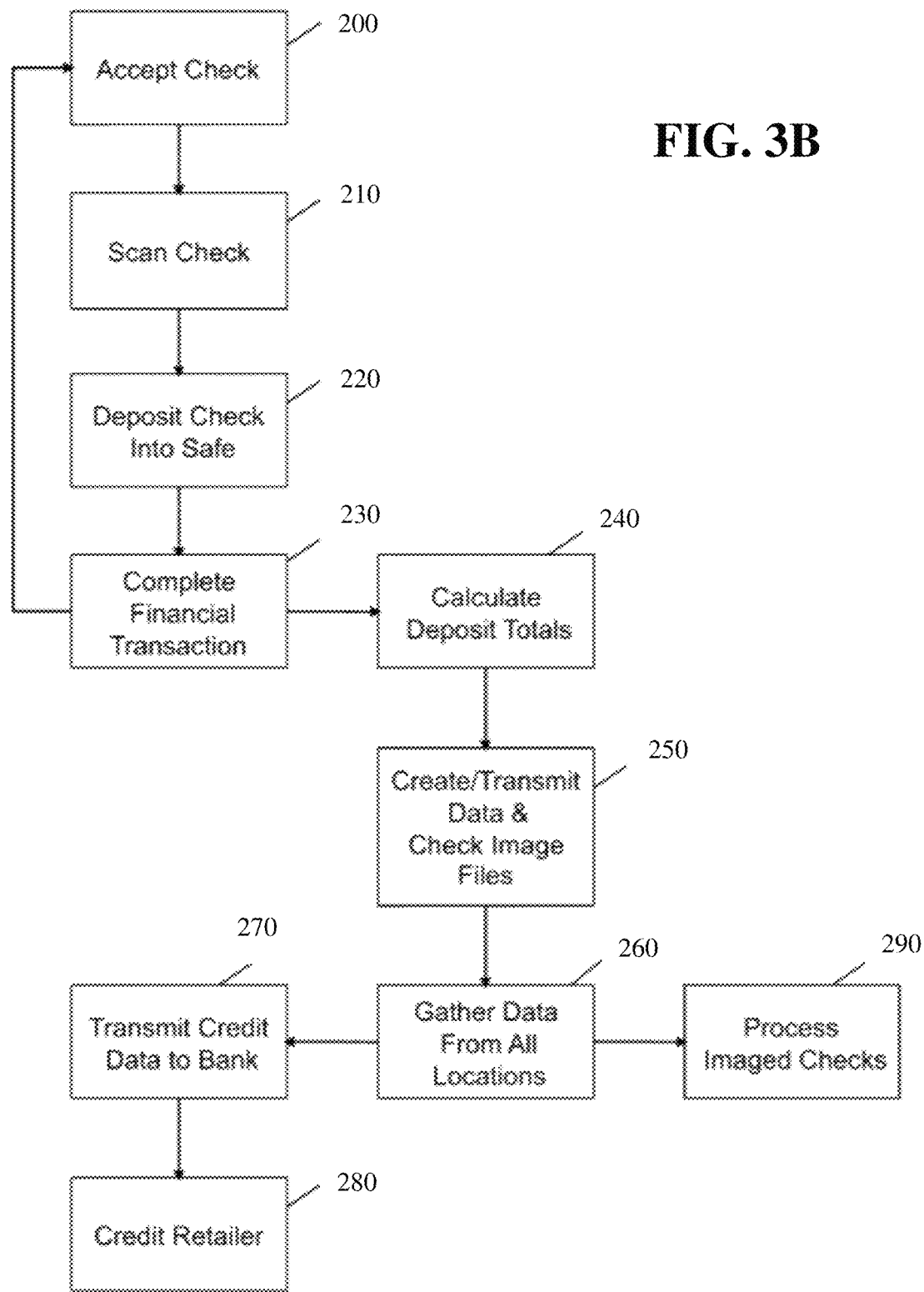

Referring again to the drawings, FIGS. 3A and 3B schematically show processes performed by each of the entities and components of FIGS. 1A, 1B and 2 in order to advance credit to a retailer. FIG. 3A relates to the processes performed with respect to cash currency collections, while FIG. 3B relates to the processes performed with respect to check currency collections. The processes of FIGS. 3A and 3B are shown separately for purposes of clarity. However, in certain embodiments of the present invention, these processes are combined and are performed by the same entities and components.

FIG. 3A of the drawings is a schematic flow diagram that shows in general terms the process for advancing credit to retailers for cash currency collected by the safe(s) located at the retailers' locations in accordance with the present invention. In describing the inventive process, reference also is made to the various entities shown in FIGS. 1A, 1B and 2. Initially, a retailer 10 collects cash currency in exchange for goods and/or services, as shown as step 100. As one example, a grocery store retailer may receive twenty-five dollars in cash currency from a customer in exchange for a certain amount of groceries that are being purchased by that customer. The collected cash currency is deposited into a suitable currency receiving device, such as a safe, as shown as step 110. In the grocery store example, the retailer's cashier (or clerk or other employee of the retailer) deposits the cash currency into an electronic cash register, electronic safe, electronic drop safe, or other device (hereinafter, collectively, "safe"). The cash currency can be deposited into the safe during the transaction with the customer or after the transaction is completed.

Figure 4:
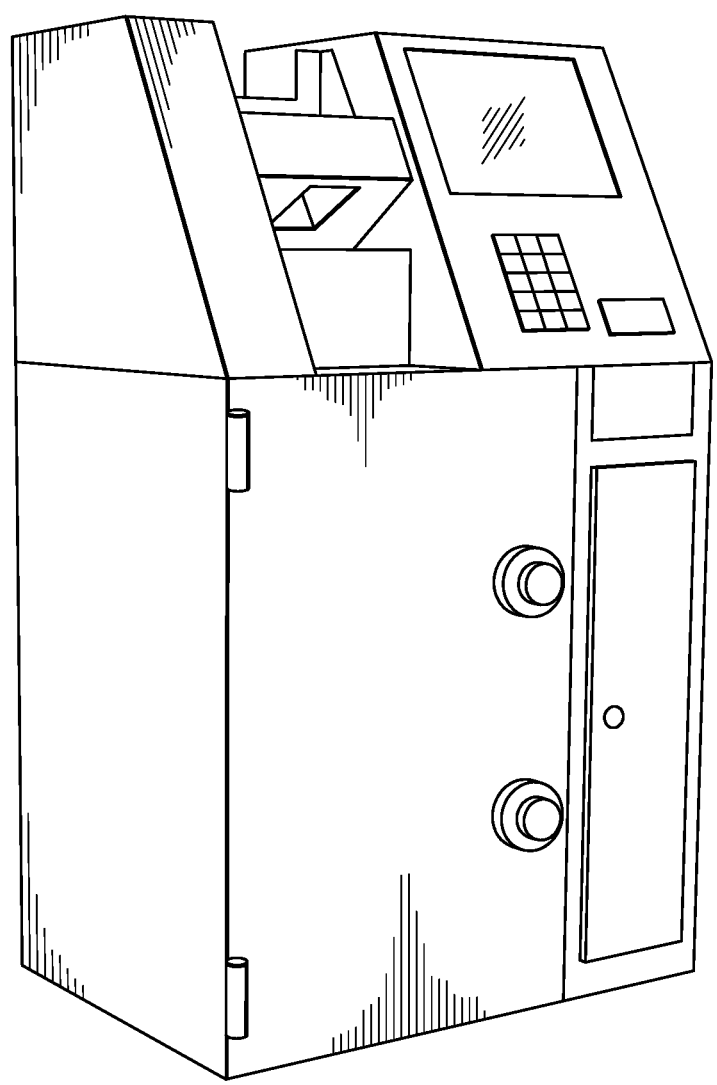
FIG. 4 shows the Brink's CompuSafe 4000® safe, which may be employed in the present invention.

As shown in FIGS. 1A, 1B and 2, the safe that receives the cash currency electronically communicates with the process facilitator. This communication may be via the Internet, telephone system, a private communications network or other suitable manner. Transmissions between the safe and the process facilitator are preferably secure and may be encrypted to ensure proper security and privacy. The safe also preferably has the capability to recognize the denomination of the currency and the capability to accumulate the cash deposit totals (the terms "cash deposits" and similar terms and "cash collections" and similar terms are interchangeably used herein) for a predetermined period of time, such as a business day, or for a sub-period of a predetermined period of time, which may span one or more business days. As one example, a suitable safe that may be employed with the herein-described process of the present invention is the Brink's CompuSafe 4000® safe, which is shown in FIG. 4 of the drawings. Some of the features of the Brink's CompuSafe 4000® safe are discussed in U.S. Pat. Nos. 5,695,038; 5,975,275; and 5,944,163, which are assigned to the assignee of the present application and are incorporated herein by reference. In the Brink's CompuSafe 4000® safe and as discussed in the foregoing identified patents, bill acceptors within the safe accept the cash currency and transfer the accepted cash currency into sealed cassettes disposed within the safe, and a processor of the safe produces deposit reports that identify the contents of the sealed cassettes. The deposit reports specifically identify the stored contents by denomination, the total cash deposit, and other information. The Brink's CompuSafe 4000® safe, however, is only one exemplary safe that may be employed. It is noted that the Brink's name and the CompuSafe® mark are registered trademarks of Brink's Network, Inc., the assignee of the present application.

During the course of the retailer's business day, additional cash currency is collected during transactions with additional customers and the collected cash currency is continuously deposited into the retailer's safe. A retailer may have a single safe at a single location, multiple safes within a single location or multiple safes at multiple locations. No matter the case, cash currency is collected and deposited with each safe, and the amounts deposited are maintained by the safes.

At a certain time of each day, preferably (although not necessarily) at the close of the retailer's business day, the deposit totals of each of the retailer's safes are determined, shown as step 120 in FIG. 3A. In the above grocery store example, if the grocery store had a single location with two safes, the total deposit amounts of the two safes are obtained to identify the total amount of cash currency that has been collected by that retailer during the course of the business day. For retailers with multiple locations, the total deposit amounts of all safes within all of the retailer's locations are obtained. In a variation, the total deposit amounts of the safes within a select number of the retailer's locations are obtained. For example, a retailer with stores in different parts of a country (e.g., on both the east coast and west coast of the United States), or in different countries, may desire to employ the process of the present invention separately for its stores in such different areas.

In any of the examples provided above, it is appreciated that the amount of cash currency collected by a retailer generally is a function of the size of the retailer, the number of locations (e.g., retail stores) of the retailer, the types of goods/services that are provided, the relative amount of use of credit/debit cards by the retailer's customers, and other factors. In any event, and as illustrated herein, the inventive process for advancing credit to retailers may be applied to retailers of any size who accept payment in the form of cash currency.

As mentioned above, deposit totals are calculated at a certain time of each day. The time of day may be defined by the retailer's standard time of close of business day, or the respective store's end of business day. The time may be manually identified each day. For example, a retailer's employee may manually instruct the safe to "close-out" the business day. Further, another time may be selected that does not coincide with the retailer's business day. In a further variation, deposit totals are calculated every other day, every third day, or at other periods of time. In any event, deposit totals are calculated (or calculated/maintained by the safes during the course of the retailer's operations) at a given point of time. For convenience hereinafter, such given point of time is referred to as "end of day."

Upon calculating the deposit totals at the end of day, the safe at one retailer location (e.g., 10a shown in FIG. 1) creates a data file that contains the deposit totals at that location and electronically transmits the created data file to a process facilitator, such as process facilitator 50 shown in FIGS. 1A, 1B and 2. Data file creation and transmission are represented as step 130 in FIG. 3A. Similarly, respective safes at each of the retailer's other locations (e.g., 10b, 10c, etc.) create respective data files that contain the deposit totals at the respective location, and all of the created data files are electronically transmitted to process facilitator 50.

In a variation of that represented by step 130 as described above, the retailer's safe (or safes for multiple locations) transmits information, either once at the end of day or periodically throughout the day, to another system within or controlled by retailer 10, such as a computer system, to enable that other system to create the above-mentioned data file, which is then transmitted to process facilitator 50. The information may be transmitted to a temporary electronic storage medium located at retailer 10, or may be transmitted securely, for example, to retailer's 10 main processing facility (e.g., via an intranet, via a website, etc.). Appropriate data may be transmitted multiple times and periodically within, for example, each business day from the retailer's safe, either directly or indirectly, to a system within or controlled by retailer 10 or to a system within or controlled by process facilitator 50.

The safe (or safes for multiple locations) within retailer 10 transmits the total amount of cash currency that has been collected since its previous data transmission, with the last transmission representing such amount at the above-defined end of day. Then, the system to which all of the transmissions are sent, i.e., the process facilitator 50, calculates, based on all of the data transmissions, the amount of the deposit totals for that safe within retailer 10. In yet another variation, one or more computing systems controlled by retailer 10 or, alternatively, controlled by process facilitator 50 remotely access the retailer's safes, pulling cash totals at predetermined times.

As discussed above, process facilitator 50 includes a suitably programmed computing system (or systems) that receives the electronically transmitted data files. Transmission may occur in any known manner, such as via the Internet, telephone system, a private communications network or other suitable manner. Preferably, transmissions are encrypted to ensure proper security and privacy. Since electronic data transmission and encryption, as well as the hardware/software that are capable to carry out such transmission and encryption, are well known, further description thereof is omitted herein except where necessary for an understanding of the present invention.

The computing system within the process facilitator 50 gathers and accumulates the cash deposit totals of all locations of retailer 10 (e.g., 10a, 10b, 10c, etc.) based on the information contained in the data files transmitted from each location. As each transmission is received, process facilitator 50 processes each data file, each representing a respective location of retailer 10. Upon receiving all of the transmissions, process facilitator calculates the total cash deposit for all locations of retailer 10. The gathering and calculating (accumulating) of the total cash deposit for retailer 10 for that particular business day/time period is represented as step 140 in FIG. 3A. This step represents central management by the process facilitator 50 of the data received from the safes, which reduces processing requirements on the safes and on any computing system at the retailer's location.

Upon calculating the total cash deposit for all locations of retailer 10, for the relevant time period, the process facilitator 50 electronically transmits an encrypted data file containing the total cash deposit information, along with retailer 10 identification information, to the banking institution 40, as represented as step 150 in FIG. 3A. The banking institution 40 (or other type of financial institute, collectively referred to herein as a "bank" or "banking institution") processes the transmission (e.g., performs identity verification and other security handling as is well known) and credits the bank account of retailer 10 with the identified total cash deposit, as represented as step 160 in FIG. 3A. As discussed above, the processing requirements on the safes and their respective banking institutions are reduced because the process facilitator 50 centrally performs the necessary processing on the data received from the safes to create the consolidated data file with the consolidated information including the total currency deposit and the retailer's identification information. In addition, the process facilitator 50 acts as a trusted intermediary between the safes and the banking institution, and as a result, limits the number of connections and electronic transmissions to the banking institution and reduces the bandwidth required for such transmissions.

FIG. 3B of the drawings is a schematic flow diagram that shows the check handling process of the system of the present invention. Certain steps of FIG. 3B are similar to FIG. 3A, and the processes of FIGS. 3A and 3B may be combined in a single system where the safes are capable of handling both cash currency and checks.

As shown in FIG. 3B, initially, during a financial transaction, a retailer accepts a check from, for example, a customer in payment for goods and/or services, as shown at step 200. As one example, a grocery store clerk accepts from a customer a personal check for twenty dollars, made out to the grocery store retailer, in exchange for a certain amount of groceries that are being purchased by that customer. Then, during the financial transaction, the clerk deposits the check into an imaging device that images (or "scans") the front of the check to produce an image file (also called "check image file") representing the front of the check, as shown in step 210. The image file may be stored within the imaging device or elsewhere. The imaging device is represented as imager 12, in FIG. 1B. The check, upon being imaged, preferably is stored (or "deposited") in a secure storage compartment, as shown in step 220 in FIG. 3B.

In particular versions of the present invention, the check is both imaged and deposited into an electronic cash register, electronic safe, electronic drop safe, or other electronic device (herein collectively "safe") that includes both an imaging device and a suitable secure storage area for safely storing each check that is imaged. This "safe" is represented as safe 14 in FIG. 1B or can be the safe represented as 10a, 10b, 10c in FIGS. 1A and 1B. The imaging device and storage area may be integral within the safe, that is, be components disposed within the body of the safe. The imaging device and storage area may be located ancillary to the safe. As another variation, the imaging device may be external to the safe and the storage area is disposed within the safe. In any event, the check may be both imaged and deposited into the safe during the transaction with the customer or after the transaction is completed.

Similar to the process in FIG. 3A, the safe that receives the checks electronically communicates with the process facilitator 50. This communication may be via the Internet, telephone system, a private communications network or other suitable manner. Transmissions between the safe and the process facilitator are preferably secure and may be encrypted to ensure proper security and privacy. The safe also preferably has the ability to accept cash currency and to recognize the denomination of currency (e.g., cash or check) that is deposited into it and the capability to accumulate cash deposit totals over a predetermined period of time, such as a business day, or over a sub-period of a predetermined period of time. In such a preferred safe, cash is inserted into bill acceptors that identify the deposited currency, and checks are inserted into a separate acceptor ("check acceptor") that, in turn, images the inserted check and subsequently stores it. The safe also preferably has the capability to capture from the scanned check various information on the check including, for example, the payee, check number, date, amount of currency, and routing/account number.

As in the process shown in FIG. 3A, a suitable safe that may be employed with the process of FIG. 3B is the Brink's CompuSafe 4000® safe, that is additionally fitted with an imaging scanner. Thus, the safe employed with this process may include both the bill acceptors, as in Brink's CompuSafe 4000® safe, and one or more check acceptors for accepting checks and an imaging scanner for imaging the check to generate check images.

When fitted with a suitable imaging device and suitably programmed, the Brink's CompuSafe 4000® safe, as an example, accepts a check, images one side of the check (or both sides of the check in another version) to produce an image file, stores the image file within internal memory, and transfers the imaged check into a sealed cassette disposed within the safe. The processor within the safe, in a particular version, is suitably programmed to include within its deposit reports information that also identifies the total value of all of the checks stored within the safe (called herein "check deposit total"). The deposit reports may also include additional information about the stored checks, including identifying the number of checks that are stored, the respective monetary amount of each of those checks, and the date/time each check was deposited.

Although the functions of the Brink's CompuSafe 4000® safe are particularly described herein, and the Brink's CompuSafe 4000® safe fitted with an imaging device having the functions and features as described above is well-suited for carrying out various processes of the present invention, other electronic devices having such functions may be employed. For example, Brink's CompuSafe® 3000 Series, fitted with an imaging device, also may be employed. Other electronic devices, including those of other companies, may be utilized. It is noted that the Brink's name and the CompuSafe® mark are registered trademarks of Brink's Network, Inc., the assignee of the present application.

Returning to the flow chart shown in FIG. 3B, the financial transaction being carried out is completed, as shown as step 230. During such completion, various activities may be implemented, including displaying the scanned image on a display device and verifying by the clerk that the scanned image is clear and easily readable. The display device may be incorporated within the safe, be incorporated within an attached device, or be a separate device altogether. At the end of the transaction, a receipt preferably is printed (e.g., by an attached printer or a printing device integrated within the safe) that includes information concerning the financial transaction and that also includes a printed image of the scanned check. The clerk provides the printed receipt to the customer and the transaction is concluded.

During the course of the retailer's business day, additional financial transactions are processed, as represented by an arrow extending from step 230 to step 200 in FIG. 3B. Additional checks may be collected and the collected checks are imaged and deposited into the retailer's safe in the manner described above. In cases in which customers provide cash as payment for goods or services, the retailer deposits the collected cash currency into a suitable cash-receiving device, which may be the same safe into which checks are deposited, that is, the safe described above (transactions involving cash not shown in FIG. 3B and are shown in FIG. 3A). Preferably, the safe maintains both the cash deposit totals and the check deposit totals during the course of the business day.

Each of the variations of the present invention, as described above, have been described in the context of a retailer that employs a single device, such as an electronic drop safe that images each check, stores the generated image file, and stores (deposits) the actual check within a storage area. Cash currency also may be deposited into that same device or a separate device, as already discussed. A retailer may also employ multiple safes having the above-described features that are disposed within a single location or multiple safes that are disposed at multiple locations. No matter the case, checks are imaged and deposited and cash currency is deposited within each safe, and preferably, the value of each deposited currency (cash and checks) is maintained by each safe.

At a certain time of each day, preferably (although not necessarily) at the close of the retailer's business day, the deposit totals of each of the retailer's safes are calculated, as shown as step 240 in FIG. 3B. This step is similar to step 120 in FIG. 3A. In the above grocery store example, if the grocery store had a single location with two safes, the total deposit amounts of the two safes are obtained to identify both the total monetary value of the checks that have been collected and the total amount of cash that have been collected by that retailer during the course of the business day. For retailers with multiple locations, the total deposit amounts of all safes within all of the retailer's locations are obtained. In a variation, the total deposit amounts of the safes within a select number of the retailer's locations are obtained. For example, a retailer with stores in different parts of a country (e.g., on both the east coast and west coast of the United States), or in different countries, may desire to employ the process of the present invention separately for its stores in such different areas.

As discussed above with respect to FIG. 3A, deposit totals are calculated at a certain time of each day. The time of day may be defined by the retailer's standard time of close of business day, or the respective store's end of business day. The time may be manually identified each day. For example, a retailer's employee may manually instruct the safe to "close-out" the business day. Further, another time may be selected that does not coincide with the retailer's business day. In a further variation, deposit totals are calculated every other day, every third day, or at other periods of time. In yet another variation, deposit totals are calculated on an intraday basis, that is, deposit totals are calculated multiple times in a given day, whereby the herein-described process is carried out multiple times on that day. In any of these cases, deposit totals are calculated (or calculated/maintained by the safes during the course of the retailer's operations) at a given point of time. For convenience, and without limiting the description to calculating the deposit totals at the actual end of a retailer's business day or calendar day, the point of time deposit totals are calculated is referred to hereinafter generically as the "end of day."

Upon calculating the deposit totals at the end of day, the safe at one retailer location (e.g., 10a shown in FIGS. 1A, 1B and 2) creates a data file that contains the deposit totals at that location and electronically transmits the created data file and the stored check image files to a process facilitator, such as process facilitator 50 shown in FIGS. 1A, 1B and 2. Data file creation and transmission of the data and check image files are represented as step 250 in FIG. 3B. Similarly, each safe at each of the retailer's other locations (e.g., 10b, 10c) creates a respective data file that contains the deposit totals at that respective location and electronically transmits the data file and the check image files stored at that respective location to process facilitator 50.

In a variation of that represented by step 250 as described above, the retailer's safe (or safes for multiple locations) transmits data and the stored check image files, either once at the end of day or periodically throughout the day, to another system within or controlled by retailer 10, such as a computer system, to enable that other system to create the data file, which is then transmitted along with the check image files to process facilitator 50. The data and check image files may be transmitted to a temporary electronic storage medium located at retailer 10, or may be transmitted securely, for example, to retailer 10's main processing facility (e.g., via an intranet, via a website, etc.). Data and/or check image files may be transmitted multiple times and periodically within, for example, each business day from the retailer's safe, either directly or indirectly, to a system within or controlled by retailer 10 or to a system within or controlled by process facilitator 50.

The safe (or safes for multiple locations) within retailer 10 electronically transmits the total monetary value of the deposited checks, the value of each check, the check image files, as well as the total amount of cash that has been collected, since the safe's previous transmission. Then, the system to which all of the transmissions are sent calculates, based on all of the transmissions, the amounts of the deposit totals for that safe within retailer 10. In yet another variation, one or more computing systems controlled by retailer 10 or, alternatively, controlled by process facilitator 50 remotely access the retailer's safes, pulling deposit totals, check value data, check image files and other data at predetermined times.

The computing system, e.g., CPU or other processor, within process facilitator 50 gathers and accumulates the check and cash deposit totals, and the check image files of all locations of retailer 10 (e.g., 10a, 10b, 10c, etc.) based on the information contained in the files electronically transmitted from each location. Process facilitator 50 processes each transmitted file when received or at preset times. Upon receiving transmissions from all locations of retailer 10, process facilitator 50 calculates the total check and cash deposits for all locations. The gathering of the data and check image files, and calculating (accumulating) of the total check and cash deposits for retailer 10 for that particular business day/time period is represented as step 260 in FIG. 3B. This step is similar to step 140 in the process of FIG. 3A.

Upon calculating the check and cash deposit totals for all locations of retailer 10, for the relevant time period, process facilitator 50 electronically transmits an encrypted data file containing the total deposit information, along with retailer 10 identification information, (also called "credit data" herein) to bank 40, as represented as step 270 in FIG. 3A. Banking institution 40 (or other type of financial institute, collectively referred to herein as a "bank" or "banking institution") processes the transmitted credit data (e.g., performs identity verification and other security handling as is well known) and credits the bank account of retailer 10 with the identified total check and cash deposit, as represented as step 280 in FIG. 3B. In general, banking institution 40 and process facilitator 50 preferably enter into a contractual relationship to facilitate the herein-described crediting to retailer 10 of funds in the amount of the total deposits of retailer 10.

In addition to facilitating advance credit to retailers for their check as well as cash deposits, in a particularly preferred embodiment of the present invention, each of the deposited checks are also processed by process facilitator 50 by utilizing the check image files that have been transmitted from retailer 10. As represented by step 290 in FIG. 3A, process facilitator 50 carries out electronic processing of the imaged checks (i.e., the check image files). In such preferred embodiment, process facilitator implements all processing of the imaged checks necessary to draw the funds from the accounts held by the customers (e.g., within customer banks 60A, 60B, 60C shown in FIG. 1B). Process facilitator may carry out any industry accepted electronic conversion process, including, as an example only, Back Office Conversion (BAC) wherein accepted checks are converted to ACH debits. Since the requirements and operations to process a check are well known, a description thereof is not provided except where necessary for an understanding of the present invention. After the imaged checks are processed, the actual checks collected by retailer 10 may be destroyed by the retailer (e.g., 7 business days after receipt) or delivered to another entity for storage or destruction thereof. Similarly, the check image files stored by retailer 10 may be deleted after a preset period of time after collection or processing (e.g., 10 business days after receipt). In this configuration, the process facilitator further alleviates the processing requirements on the banking institution by performing the processing of checks in a centralized manner.

In variations of the invention that do not electronically process the check image files to draw funds from the customer accounts, any legally acceptable manner of check handling may be employed, including as an example depositing of a customer check within the bank holding the account (i.e., On-Us check). Other suitable check handling processes may be employed.

As mentioned above, retailer 10 may have multiple locations (e.g., 10*a*, 10*b*, 10*c*), wherein a safe (or other device) at each location calculates the check and cash deposit totals at the respective location at the identified end of day and thereafter creates and electronically transmits to process facilitator 50 a respective data file with the deposit total information (along with appropriate retailer location identification data and the check image files). The "end of day" for each location may occur at the same time of day or may occur at different times of day. For retailers with a relatively large number of stores located, for example, throughout a country or region, different locations may likely have different "end of day" times. For example, certain retailer locations may have different times of operation, may have the same times of operation but operate in different time zones, or a combination of the two.

The herein-described inventive process for advancing credit for cash and check collections beneficially is well suited for large-scale retailers having many locations with different times of operation. Safes at each location accumulate the check and cash totals for the respective location and at a designated "end of day" for such location, create one or more data files that contain the deposit totals for that location and check images of the collected checks. Over the course of, for example, a 24 hour time period, process facilitator 50 receives and processes these data files, including check image files, from the retailer's different locations and upon receipt of data files from all of the retailer's locations, calculates a total amount for all locations and electronically transmits this total amount to the retailer's banking institution together with the identifying information of the retailer. The banking institution then credits the retailer's bank account with amount based on the data received from the process facilitator that includes the total amount for the respective day.

Figure 5:
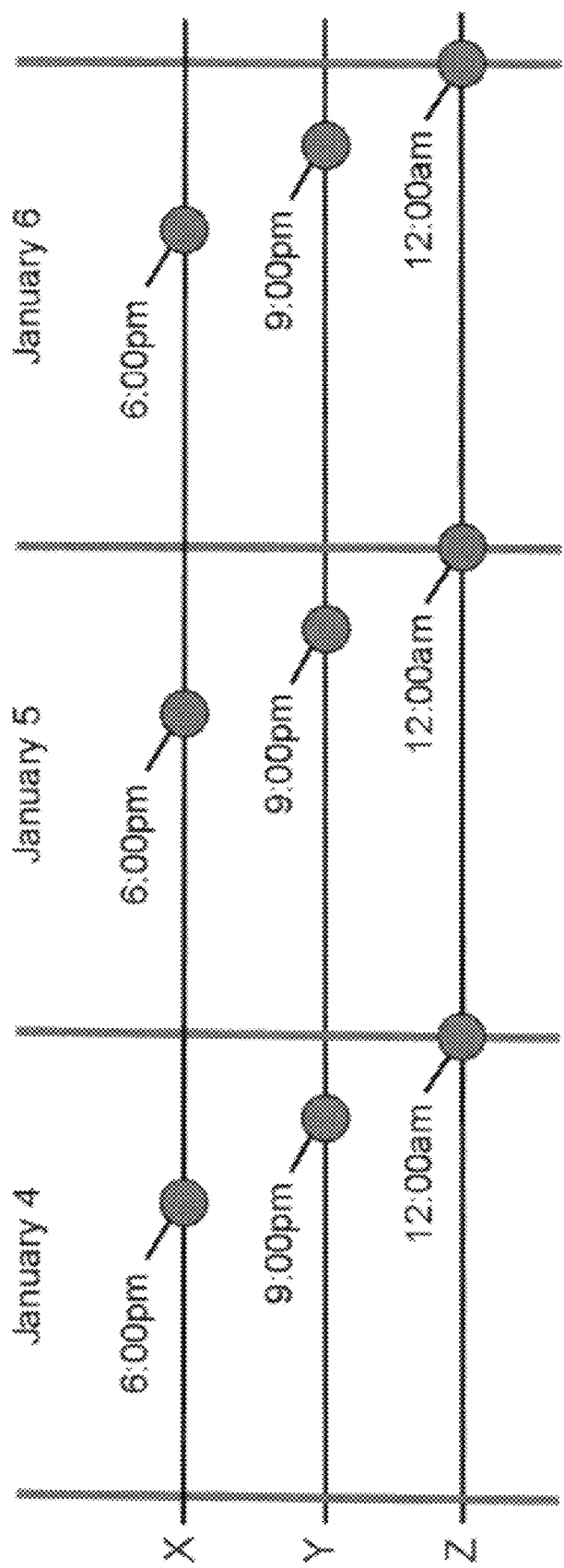
FIG. 5 is a diagram useful for describing various features of the present invention.

FIG. 5 is a diagram that is used to explain the operation of the present invention entailing a retailer with multiple locations and where different locations have different ends of day. For example, and referring to FIG. 5, an exemplary retailer has a number of store locations "X" that have an end of day at 6:00 pm (each such location identified herein as an "X location"). The exemplary retailer also has a number of other store locations "Y" that have an end of day at 9:00 pm (each such location identified herein as a "Y location"). Finally, the exemplary retailer further has a number of store locations "Z" that have an end of day at 12:00 am (i.e., midnight) (each such location identified herein as a "Z location"). In accordance with the present invention, on a given business day, such as January 5, a safe (or safes) at each X location ascertains at the end of day of 6:00 pm the amount of currency (checks and cash) collected between 6:00 pm of the previous business day of January 4 and 6:00 pm of the current business day of January 5. Thereafter, the ascertained amount of currency collected during this time period is identified within a data file that is electronically transmitted, along with the check image files, to a process facilitator. Similarly, on that same day, that is, on January 5, a safe at each Y location ascertains at 9:00 pm (i.e., the "end of day" of each Y location) the total amount of currency that was collected at that location between 9:00 pm of the previous business day of January 4 and 9:00 pm of that day, and such total amount is electronically transmitted, together with the check image files, to the process facilitator. A safe at each Z location ascertains at 12:00 am (i.e., the "end of day" of each Z location) on January 6 the total amount of currency that was collected at that location between 12:00 am of the previous business day of January 5 and 12:00 am of that business day of January 6, and the ascertained total amount is electronically transmitted, together with the check image files, to the process facilitator. Process facilitator then processes the data received from all of the safes, determines the total reported amount, generates consolidated data that includes the total reported amount and identification information of the retailer (an may include check images), and securely transmits the generated consolidated data to a banking institution so as to arrange for the banking institution to credit the retailer with the total reported amount. As discussed above, the process facilitator may encrypt the consolidated data for secure transmission thereof to the banking institution.

As illustrated in the above example, the retailer may be provided with a credit each day based upon currency collections that occur over different periods of time within the retailer's different store locations. Each end of day may represent the time at which a respective retailer location closes. Or, one or more locations of the retailer may close at a time that differs from the respective location's end of day. Still yet, one or more locations of the retailer may be open 24 hours, that is, not be closed at all. In such cases, a credit may be provided for currency collected at one location at the end of that business day, while a credit may be provided for currency collected at another location at the end of the next business day. For example, currency collected at 8:00 pm at a location Y on January 5 will be credited to the retailer at the end of that business day (i.e., at the end of January 5). However, currency collected at 8:00 pm at a location X on January 5 will not be credited to the retailer until the end of the next business day, that is, on January 6. If this is not desired, then the "end of day" of particular locations may be modified. But, in any event, it is seen that the herein-described inventive process for advancing credit for currency collections is sufficiently flexible to accommodate retailer locations that have different operating schedules, that operate in different time zones, that perhaps have different cash flow needs, and/or that may have or that desire to have different end of day times. In each of these cases, the present invention enables retailers to receive credit on a basis that is more closely aligned with the volume of their currency collections, and that is not dictated by the schedule that the physical checks and cash are picked-up for deposit into a bank or other third party schedule, as further discussed below.

As described herein, the process facilitator 50 receives data files that collectively identify the currency collections (checks and cash) at all of the retailer's locations and thereafter ascertains the total credit to be provided to the retailer (e.g., for that business day). In a variation, process facilitator 50 may impose a predefined cut-off time by which data files from all locations of the retailer must be received. Then, at such cut-off time, the process facilitator 50 calculates the total check and cash deposits for those locations that have transmitted the respective data files and electronically transmits such total deposit information to bank 40 for subsequent credit to retailer 10 in the amount indicated. In such case, advance credit still is provided even if all of the retailer's locations are unable, for whatever reason, to transmit the data to process facilitator 50. As one example, technical difficulties at a location may prevent or otherwise delay proper processing at such location. No matter the case, the present invention provides advance credit of all, or at least a part, of a retailer's checks and cash deposits. If only a part of the retailer's cash deposits are credited, the non-reported deposits may be credited at a later time, such as at the end of the next "end of day."

As mentioned above, the herein-described inventive process for advancing credit for currency collections expedites funds availability to a retailer. As described above, the "end of day" occurs at a certain point in time. In such case, the retailer is credited once each day for the currency that is collected generally during the preceding 24 hour period. The herein-described process, however, may be carried out multiple times a day, such as at every 12-hour period. Conversely, the process may be carried out less than once per day, such as every other day. For example, smaller retailers (e.g., with only a single location or a few locations) may accumulate relatively few checks (or checks of small value) and/or little cash each day and, thus, carrying out the process every two or three days may be sufficient for such smaller retailers.

In yet another variation, a retailer with multiple locations may, in a sense, be treated as multiple retailers. For example, credit may be provided after retailer locations in one part of the country report their deposit totals and then, separately, credit is provided after the other retailer locations report their deposit totals. Such a subdivision may be based on geographic criteria or other basis.

In the present invention, by using a central process facilitator, all of the locations can transmit to the process facilitator their respective data and check image files at their respective "end of day", and the process facilitator then centrally consolidates this data, generates consolidated data for transmission to the banking institution and electronically communicates with the banking institution to transmit the consolidated data in a secure manner. As discussed above, by using the central process facilitator to communicate with the banking institution, the processing operations required for obtaining the credit are distributed among the process facilitator and the safes, and the process facilitator acts as a central intermediary for communications with the banking institution so as to reduce the amount of data transmitted to the banking institution, to limit the number of connections to the banking institution and to reduce the bandwidth requirements. Moreover, the use of the process facilitator allows for a more dynamic system, wherein the safes can transmit data to the process facilitator at different times of day, safes may be moved from one location to another or replaced with other safes, and safes may be added or removed, as needed. The central process facilitator of the present invention also allows the safes of a single retailer to be sub-divided into different groups, as discussed above, so as to treat different groups as different retailers for the purpose of obtaining credit from the banking institution. This central management by the process facilitator enables great flexibility within the system with respect to how the safes are sub-divided, when and how the data received from the safes is consolidated and when the consolidated data is communicated to the banking institution.

In each of the variations described herein, a retailer is credited with the total deposits accumulated over a period of time (e.g., each business day) based on deposit totals as reported by each of the safes at the retailer's locations. Accordingly, the present invention enables a retailer to enjoy the benefit of the value of the accepted checks and its cash receipts almost immediately upon collecting those checks and cash from its customers. The actual checks and cash, however, still remain at the retailer location(s) even after the retailer is credited with those receipts. Co-pending application Ser. No. 12/178,109, filed Aug. 23, 2008, entitled Process of and System for Facilitating Cash Collections Deposits and Deposit Tracking, owned by the assignee of the present application and incorporated herein by reference, is directed to facilitating novel cash collections deposits (i.e., handling of the physical cash itself) and deposit tracking and such process or portions of such process may employed in conjunction with the herein-described inventive process for advancing credit for check and cash collections. In any event, regardless of whether the invention described in co-pending application Ser. No. 12/178,109 is employed, generally an armored car service provider 20 (FIGS. 1A and 1B) picks up from retailer 10 the cash deposits and possibly the collected checks at preset periods of time (e.g., daily, twice daily, every other day, weekly, etc.) and transports the picked up deposits to a processing facility (e.g., cash processing facility 30 shown in FIGS. 1A and 1B) for further handling. As used herein, an armored car service refers to any entity that picks up the cash deposits and/or the collected checks, and includes courier or message services (including governmental and private postal delivery services) that employ or do not employ armored cars. Still further, the cash deposits and the collected checks may be delivered together or separately to the same processing facility or may be delivered to different processing facilities. For example, cash deposits may be picked up by an armored car service that, in turn, transports the picked up cash to a cash processing facility and, separately, the collected checks are picked up by a courier service and delivered to a bank (or other financial or non-financial institute). As described herein, any reference to the pickup or delivery of cash deposits and collected checks shall include any of the above-identified pickup/delivery variations.

Crediting as described herein does not need to coincide with a business day. In addition, and as mentioned above, a retailer is credited with its check and cash collections in advance of, sometimes several days or more prior to, when the checks are processed, when the monetary funds represented by the checks become available for use by the retailer and/or when the actual cash reaches the bank. As one beneficial feature of the present invention, a retailer can be provided with credit for its check and cash collections on a more frequent basis than when those cash collections are picked-up, for example, by an armored car service and/or when the checks are delivered to a check processing facility (e.g., bank or other facility). For example, for relatively small retailers, a retailer's deposits are picked up every other day, or every third day, or based on a cash volume basis, or based on another basis, whereupon that retailer may be credited in accordance with the present invention with its check and cash collections on a daily basis. In such case, a retailer obtains the benefit of daily credit without incurring the expense of daily pick-up. Thus, the present invention disassociates the time and frequency of a retailer's pickup schedule from the time and frequency of when that retailer is credited for its currency collections. More specifically, a retailer is able to enjoy the benefit of its collections on a basis that is independent of when those collections are actually picked up, when the checks are processed, when the funds represented by the checks become available for use by the retailer, when the cash is processed (e.g., by a third party cash processing facility), or when the cash is deposited into a bank. Moreover, the computerized system of the present invention accomplishes these benefits with high technological efficiency, and is easily customizable and dynamic so as to allow great technical flexibility of the system.

As described, retailer 10 is credited with its collections based on a schedule that is independent from the schedule at which collected cash is picked-up by an armored car service (e.g., armored car service 20 shown in FIGS. 1A and 1B) and/or checks are delivered to processing facilities. For example, armored car service provider 20 picks up from retailer 10 the collections at preset periods of time (e.g., daily, twice daily, every other day, weekly, etc.) and transports the collections, preferably stored within secured deposit bags to a cash processing facility (e.g., cash processing facility 30 shown in FIG. 1) for further handling. Alternatively, a retailer may manually schedule a pickup by armored car service provider 20 based upon the volume of cash and/or checks that have been collected by that retailer. Regardless of whether the pickups are pre-scheduled or manually scheduled by the retailer, the retailer is provided with advance credit for its check and cash collections shortly after the retailer receives the checks and cash.

Figure 6:
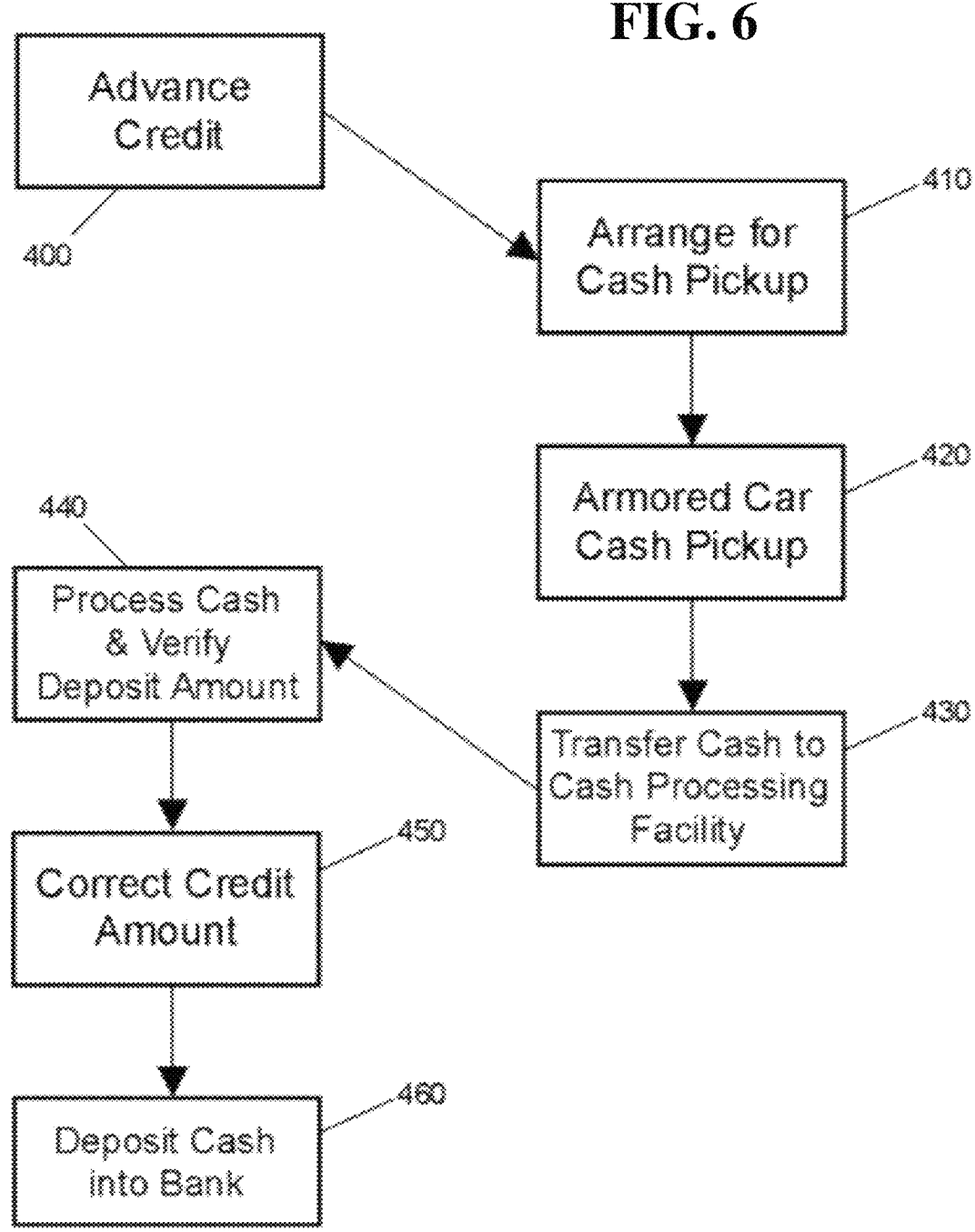
FIG. 6 is a flowchart showing in broad terms the overall operation of the present invention.

Turning now to FIG. 6, a flowchart showing in broad terms the overall process flow, from advancing credit prior to check/cash pickup through final processing of the checks/cash, is shown. Initially, step 400 in FIG. 6 represents the entire, above-described process of providing retailer 10 with advance credit for its cash collections. This process uses the system of the present invention that includes the process facilitator and one or more safes, and is described above with reference to FIGS. 3A and 3B. Thereafter, at a pre-scheduled time or when the retailer collects a sufficient amount of currency or at another time, retailer 10 arranges or prepares for a pickup, as shown as step 410 in FIG. 6. The retailer 10 may prepare for a pickup in the manner described in application Ser. No. 12/178,109, identified above, or in any other manner. For example, a manager or other authorized employee or agent of the retailer 10 (hereinafter, for convenience, a "manager") initiates a deposit transaction (also called herein "deposit creation"), in preparation for depositing currency into a bank, by logging onto a secure website of process facilitator 50 (or other entity) and supplies to the process facilitator (via the website) various deposit details including deposit amounts by denomination or deposit amounts by check amount for each collected check. In a variation, and in accordance with the present invention, this information is automatically transmitted or has already been transmitted to process facilitator 50 in any of the manners previously described herein. A deposit ticket is produced and is placed within a deposit bag along with the cash and/or checks to be deposited. The deposit ticket may be automatically generated and printed, and identifies the amount of each currency denomination, the total amount of checks and/or cash to be deposited, the retailer identification, a bar-code that uniquely identifies the deposit and other useful information. The deposit ticket and the cash and/or checks are placed within a tamper-evident bag, and the bag is sealed in preparation for pickup.

At a prescheduled or manually scheduled time, armored car service provider 20 picks up the sealed bag from retailer 10, as represented as step 420 in FIG. 6. Although generally not preferred, particularly for relatively large amounts of currency, the entity that picks up the sealed bag may be a courier or message service that does not employ armored cars. For purposes herein, "armored car service" or other similar term refers to the service that picks-up checks and/or cash from the retailer. The armored car service generally performs its standardized pick-up procedures and thereafter transfers the sealed bags to a cash processing facility 30 for further handling, as represented as step 430 or to a check processing facility.

Cash processing facility 30 carries out certain procedures during its handling of each sealed deposit bag. As one example of the procedures carried out by cash processing facility 30, an authorized personnel at cash processing facility 30, who preferably is logged onto a secure website of process facilitator 50 by use of a unique User ID and password, identifies each sealed deposit bag by utilizing a barcode scanner that reads the barcode on the outside of the sealed deposit bag. Upon recognition of the unique barcode by the system, the status of the sealed deposit bag is designated "Received" (or other suitable designation) and the date and time of the status change is recorded.

After the sealed deposit bag is "received" by cash processing facility 30, cash processing facility 30 verifies the contents of the deposit bag (called, for convenience, "verification" herein), as shown as step 440 in FIG. 6. Such verification may occur at any time after receipt, but it need not occur on the same day that the sealed deposit bag (i.e., the collected cash and/or checks) is received. For example, verification may occur on the next business (or calendar) day or even on a future date. In any event, verification entails identifying the deposit bags (by using a barcode scanner), opening the deposit bags, removing the currency (cash and/or checks) contained within the deposit bags and counting the currency to verify that the actual currency content, i.e., cash amounts and/or check values, coincides with the deposit detail information identified on the deposit ticket and the electronic data previously supplied by retailer 10 as described above.

Each sealed deposit bag prior to verification (i.e., upon receipt of the sealed deposit bag) and also during verification is identified by the use of bar-code technology, which includes use of a bar-code on each deposit bag and suitable bar-code reader equipment. However, other identification technology may be employed, including RFID technology in which each deposit bag contains an RFID chip containing a unique ID (preferably embedded within the deposit bag itself), and suitable RFID readers disposed at the retailer and the cash processing facility and optionally by the armored car service provider. Other identification technologies may be employed. As used herein, all references to barcode, barcode readers, etc., shall include other suitable identification technology.

When the barcode is read at cash processing facility 30, both upon receipt of the sealed deposit bag and during verification, as mentioned above, all information pertinent to the identity of retailer 10, which is pre-stored in a database, including relevant banking information (e.g., the bank account of retailer 10) and all information pertinent to the contents of the deposit bag itself are immediately made available to cash processing facility 30.

During verification, if cash processing facility 30 discovers an overage or shortage in the amount of currency contained in the deposit bag(s) as compared to the deposit total amounts previously reported by retailer 10 and previously credited to retailer 10 in accordance with the present invention, such overage/shortage is communicated to banking institution 40 to correct the amount of credit previously provided to retailer 10, as represented as step 450 in FIG. 6.

Historically useful information pertinent to the overage/shortage is stored in a database, including at least the amount of the overage/shortage, the total amount of the deposit, the date and time, the identity of the manager who created the deposit, and other potentially pertinent information.

Finally, the cash and/or checks are transferred to the banking institution 40, as shown as step 460 in FIG. 6. Cash processing facility 30 (or banking institution 40 or process facilitator 50) transmits to retailer 10 a report (e.g., an electronic file) that identifies actual cash and/or check deposit information for retailer 10 to utilize for reconciliation, tax and other purposes. The report may be an intraday report, a daily report, a weekly report, a monthly report, etc.

The information transmitted to retailer 10 includes an accounting of the particular business day or business days to which the credit is applied, including a credit breakdown by business day. In such instance, if a deposit amount identified in a data file transmitted from one of the retailer's safes corresponds to cash and/or checks collected over multiple business days, then the data file preferably includes a breakdown by business day of the respective amounts of cash and/or checks collected during each of those business days. For example, with reference again to FIG. 4, a location "X" has an end of day at 6:00 pm as shown, but is open 24 hours a day. If, for example, the retailer's business day coincides with a calendar day, then at 6:00 pm on January 5, a data file is created (e.g., by the safe) and then transmitted for that location that identifies the total amount (checks and cash) collected from between 6:00 pm of January 4 through 12:00 am of January 5, and separately identifies the total amount collected from 12:00 am through 6:00 pm of January 5. With such transmitted information, the total amount of credit provided to the retailer is applied on a business day basis. Thereafter, at the next end of day at 6:00 pm on January 6, another data file is created and transmitted for that location that identifies the total amount collected from between 6:00 pm of January 5 through 12:00 am of January 6, and separately identifies the total amount collected from 12:00 am through 6:00 pm of January 6, and credit is provided accordingly. From the foregoing example, the total amount of credit provided for the business day of January 5 is based on a first transmission (at or shortly after 6:00 pm on January 5) that identifies a partial collection on January 5 (i.e., cash collected from 12:00 am through 6:00 pm) and a second transmission (at or shortly after 6:00 pm on January 6) that identifies another partial collection on January 5 (i.e., cash collected from 6:00 pm through 11:59 pm). Accordingly, credit reports are provided to the retailer that identify credit provided on a business day basis, without the need for a single transmission (from the retailer) to identify collections over each entire, complete business day. U.S. Pat. Nos. 5,695,038; 5,975,275; and 5,944,163, previously identified, discuss business day reporting in the context of producing reports that identify collections broken out by each partial business day and each full business day. Thus, safes with such capability, such as the Brink's CompuSafe 4000® safe, may be employed within the present invention to provide the above-described additional feature of allocating and reporting credit on a business day basis.

The features and variations described herein may be applied in instances where a retailer's business day coincides with its end of day, or where the business day does not coincide with the end of day, where the business day coincides or does not coincide with a calendar day, and/or where the end of day coincides or does not coincide with the calendar day.

In addition to the foregoing information provided to the retailer, the retailer additionally may access the system/database of process facilitator 50 to track the retailer's deposits, produce reports, view historical information including exceptions and variances, and receive statistical information including total expected daily deposits.

For retailers with multiple locations, various data and reports are producible on a store-by-store basis, if desired, to enable individual stores to access their own deposit/credit activity. Moreover, credit and deposit report data are available to the retailer on a store-by-store, select group of stores, or entity-wide basis, immediately or nearly immediately after cash collection and/or crediting the retailer with such cash collection.

As the foregoing-description sets forth, the present invention expedites funds availability, improves cash flow and provides other features and benefits to commercial establishments who take-in cash and checks as part of their normal business operations. In particular, advance credit is provided to retailers in novel manners that enable retailers to enjoy the benefit of cash and check collections almost immediately, without having to wait for those checks to be deposited or otherwise delivered to a processing facility or to wait for those cash collections to be picked-up by armored car service providers, and then processed by third party cash processing facilities and then eventually deposited into and processed by a bank. Such post-collection activity commonly takes several days, if not more, during which time retailers historically are not able to utilize the funds that have been collected. Retailers, both large and small, are disadvantaged by this lag period. The present invention, however, enables retailers to enjoy the benefit of their collections shortly after the checks and cash are received. These benefits are realized regardless of pickup schedules, vault cut-off windows and other schedules controlled by third parties.

In addition to expediting funds availability and improving cash flow for retailers, the present invention improves the functioning of technology involved in achieving these benefits. As discussed above, the system of the present invention uses a central process facilitator and safes provided at different retailer locations that are external to the process facilitator, and the process facilitator operates to centrally manage data transmitted from the individual safes and functions as a trusted intermediary between the safes and banking institutions. As a result, the process facilitator consolidates and manages data regarding currency collections from multiple safes and increases the processing efficiency of the system by reducing the processing requirements on the individual safes or on the banking institutions. This allows each safe to more efficiently and accurately process the currency it receives, and requires less storage and processing power for each safe. The system of the present invention, thus, distributes the functionalities and processing operations to be performed among the devices of the system in order to improve the overall efficiency of the system.

In addition, by using the central process facilitator as a trusted intermediary between the safes and the banking institutions, the communication efficiency with the banking institutions is substantially improved. Specifically, by having the process facilitator communicate with the banking institution, instead of having individual safes communicate with the banking institution, the number of connection times to the banking institution is reduced and the amount of bandwidth required for communication with the banking institution is reduced. In addition, since the process facilitator consolidates data received from the individual safes, the amount of data communicated to the banking institution is substantially reduced.

Another important technological benefit of the present invention is a substantial reduction in configuring requirements for each safe and providing a dynamic and flexible system which has an easily modifiable arrangement. As discussed above, each safe needs to be configured for communication with the process facilitator and to have the data transmitted from the safe associated with the respective entity. However, the safe does not need to be configured to communicate directly with the specific banking institution and does not require to have separate authorizations and authentications by the banking institution. This configuration allows safes to be removed from the system, added to the system, replaced within the system and moved to different locations without requiring further re-configuration for communication with the banking institution. Moreover, when an entity updates its information or banking information, this information can be centrally processed and updated by the process facilitator without separately re-configuring and updating each safe. Other improvements to technology as a result of this invention are also apparent to those of ordinary skill in the art based on the above description.

Having described the present invention including various features and variations thereof, it is intended that the appended claims be interpreted as including the embodiments described herein, the alternatives mentioned above, and all equivalents thereto.

What is claimed is:

1. A system comprising:
a communication interface configured to electronically communicate with one or more safes located at one or more first locations of an entity, said one or more first locations being external to the system, and to electronically communicate with banking institution located at a second location external to the system and different from any of the one or more first locations, wherein the system functions as an intermediary between the one or more safes and the banking institution, each of the one or more safes comprises a bill acceptor adapted for collecting cash currency, and a sealed cassette, and wherein each of the one or more safes is configured to automatically transfer the cash currency collected by the bill acceptor into the sealed cassette;
a processor; and
a memory storing instructions therein for causing the processor to execute the following operations:
electronically receiving from the one or more safes, using the communication interface via an encrypted transmission, for each business day of a plurality of business days, one or more first data files including a value of currency collected by the one of more safes between the end of a day of a business day preceding the respective business day and the end of a day for the respective business day;
processing the received one or more first data files to determine a total value of currency collected by the one or more safes of the entity between the end of the day of the business day preceding the respective business day and the end of the day for the respective business day, and to generate an encrypted second data file including the determined total value of the currency in correspondence with identification information of the entity;
electronically communicating with the banking institution, using the communication interface, on each business day of the plurality of business days, to transmit the encrypted second data file to the banking institution and to provide actual crediting to the entity by the banking institution corresponding to the determined total value of the currency included in the encrypted second data file on the respective business day, said actual crediting being provided on the respective business day and prior to removal of the collected currency from the one or more safes,
wherein the currency collected in the one or more safes includes cash currency, and
wherein the system is configured to track status of the currency collected in the one or more safes after the currency is removed from the one or more safes, wherein tracking the status of the currency collected comprises:
tracking at least one of a retailer's deposit, produce report, and historical information;
analyzing the status of the currency collected to determine an total excepted daily deposit and a presence of an exception or variance from the total expected daily deposit; and
generating statistical information regarding the retail's collected currency based on an analysis of the status of the currency collected to determine an total excepted daily deposit and a presence of an exception or variance from the total expected daily deposit.

2. The system of claim 1, wherein each of the one or more safes further includes a safe processor configured to identify the cash currency collected into the sealed cassette, to determine a total value of the cash currency collected into the sealed cassette and to generate deposit information identifying the cash currency collected into the sealed cassette.

3. The system of claim 2, wherein the deposit information generated by the safe processor includes information identifying the cash currency collected into the sealed cassette by at least one of denomination and total value of cash deposit.

4. The system of claim 1, wherein currency further includes checks and each of the one or more safes further includes:
an imaging device for imaging one or more checks to generate one or more check images; and
a secure storage area for storing each check after being imaged by the imaging device.

5. The system of claim 4, wherein each of the one or more safes further comprises a safe processor configured to determine, from the one or more check images, at least a value of the check and identification information, said identification information including one or more of identifying information of a payee, a check number, a check date, a routing number and an account number.

6. The system of claim 5, wherein the safe processor is configured to determine a total value of the checks collected into the secure storage area and to generate deposit information identifying the checks collected into the secure storage area.

7. The system of claim 6, wherein the deposit information includes one or more of the total value of the checks collected into the secure storage area, a number of checks collected into the secure storage area, a value of each check collected into the secure storage area and a date of deposit of each check into the secure storage area.

8. The system of claim 4, wherein the one or more first data files received by the system from the one or more safes include said one or more check images generated by the imaging device for each check collected during the respective business day.

9. A system comprising:
a communication interface configured to electronically communicate with a plurality of safes, each of the safes located at a respective one of a plurality of first locations of the entity and each of the safes being configured to collect currency at a respective one of the first locations of the entity over a plurality of business days, said plurality of first locations being external to the system, and to electronically communicate with banking institution located at a second location external to the system and different from any of the plurality of first locations, wherein the system functions as an intermediary between the plurality of safes and the banking institution, wherein each of the plurality of safes comprises a bill acceptor adapted for collecting cash currency, and a sealed cassette, and wherein each of the plurality of safes is configured to automatically transfer the cash currency collected by the bill acceptor into the sealed cassette; and
a processor;
wherein:
the communication interface of the process facilitator electronically communicates with each of the plurality of safes and electronically receives one or more first data files from each of the plurality of safes,
the processor receives, from each of the plurality of safes, using the communication interface via encrypted transmission, for each business day of the plurality of business days, the one or more first data files including a value of currency collected by the respective safe during the respective business day, determines, based on the one or more first data files received from each of the plurality of safes, a total value of currency collected by the plurality of safes during the respective business day, and generates the encrypted second data file including the determined total value of currency in correspondence with the identification information of the entity,
the processor electronically communicates with the banking institution, using the communication interface, on each business day of the plurality of business days, to transmit the encrypted second data file to the banking institution and to provide actual crediting to the entity by the banking institution corresponding to the total value determined by the processor, and
the processor tracks a status of the currency collected in one or more safes by performing operations comprising:
track at least one of a retailer's deposit, produce report, and historical information;
analyze the status of the currency collected to determine an total excepted daily deposit and a presence of an exception or variance from the total expected daily deposit; and
generate statistical information regarding the retail's collected currency based on an analysis of the status of the currency collected to determine an total excepted daily deposit and a presence of an exception or variance from the total expected daily deposit.

10. The system of claim 9, wherein each of the plurality of safes further includes a safe processor configured to identify the cash currency collected into the sealed cassette, to determine a value of the cash currency collected into the sealed cassette and to generate deposit information identifying the cash currency collected into the sealed cassette.

11. The system of claim 10, wherein the deposit information generated by the safe processor includes information identifying the cash currency collected into the sealed cassette by at least one of denomination and total value of cash deposit.

12. The system of claim 9, wherein currency includes checks and each of the plurality of safes further includes:
an imaging device for imaging one or more checks to generate one or more check images; and
a secure storage area for storing each check after being imaged by the imaging device.

13. The system of claim 12, wherein each of the plurality of safes further comprises a safe processor configured to determine, from the one or more check images, at least a value of the check and identification information, said identification information including one or more of identifying information of a payee, a check number, a check date, a routing number and an account number.

14. The system of claim 13, wherein the safe processor is configured to determine a total value of the checks collected into the secure storage area and to generate deposit information identifying the checks collected into the secure storage area.

15. The system of claim 14, wherein the deposit information includes one or more of the total value of the checks collected into the secure storage area, a number of checks collected into the secure storage area, a value of each check collected into the secure storage area and a date of deposit of each check into the secure storage area.

16. The system of claim 12, wherein the one or more first data files received by the process facilitator from each of the plurality of safes includes said one or more check images generated by the imaging device for each check collected during the respective business day.

\* \* \* \* \*